(12) United States Patent
Hosseini et al.

(10) Patent No.: US 11,044,621 B2
(45) Date of Patent: Jun. 22, 2021

(54) CONTROL CHANNEL MONITORING CAPABILITY FOR LOW LATENCY COMMUNICATIONS

(71) Applicant: QUALCOMM Incorporated, San Diego, CA (US)

(72) Inventors: Seyedkianoush Hosseini, San Diego, CA (US); Seyed Ali Akbar Fakoorian, San Diego, CA (US); James Beckman, La Jolla, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,631

(22) Filed: Feb. 28, 2020

(65) Prior Publication Data

US 2020/0329389 A1    Oct. 15, 2020

Related U.S. Application Data

(60) Provisional application No. 62/831,717, filed on Apr. 9, 2019.

(51) Int. Cl.
  *H04W 24/08* (2009.01)
  *H04W 8/24* (2009.01)
  *H04W 72/04* (2009.01)

(52) U.S. Cl.
  CPC .............. *H04W 24/08* (2013.01); *H04W 8/24* (2013.01); *H04W 72/042* (2013.01); *H04W 72/0446* (2013.01)

(58) Field of Classification Search
  None
  See application file for complete search history.

(56) References Cited

U.S. PATENT DOCUMENTS

| 2017/0310423 | A1  | 10/2017 | Lim et al. |
| 2020/0022144 | A1* | 1/2020  | Papasakellariou .... H04L 5/0044 |
| 2020/0169991 | A1* | 5/2020  | Lin ....................... H04W 72/10 |

FOREIGN PATENT DOCUMENTS

WO     WO-2018204886 A1    11/2018

OTHER PUBLICATIONS

International Search Report and Written Opinion—PCT/US2020/020658—ISA/EPO —Jun. 9, 2020.
(Continued)

*Primary Examiner* — Kouroush Mohebbi
(74) *Attorney, Agent, or Firm* — Holland & Hart LLP/Qualcomm

(57) ABSTRACT

This disclosure provides systems, methods and apparatus where a user equipment (UE) may indicate different physical downlink control channel (PDCCH) monitoring capabilities (such as UE capabilities in terms of the number of control channel elements (CCEs), blind decodes (BDs), number of downlink control information (DCI) formats, etc.) per monitoring span or slot. For example, a UE may support a different number of CCEs per slot or a different number of DCIs per monitoring span for different service types (such as a different number of CCEs for enhanced mobile broadband (eMBB) and for ultra-reliable low latency communications (URLLC)). A UE may indicate different sets of PDCCH monitoring capabilities (such as sets of PDCCH monitoring capabilities for different service types, monitoring spans, slots, etc.). A base station may receive the indication of UE PDCCH monitoring capability information, and may configure the UE with one or more monitoring occasions accordingly.

30 Claims, 16 Drawing Sheets

(56) References Cited

OTHER PUBLICATIONS

Mediatek Inc: "PDCCH Enhancements for NR URLLC", 3GPP Draft, 3GPP TSG RAN WG1 Meeting #96b, R1-1904503, PDCCH Enhancements for NR URLLC, 3rd Generation Partnership Project (3GPP), Mobile Competence Centre, 650, Route Des Lucioles, F-06921 Sophia-Antipolis Cedex, France, vol. Ran WG1, No. Xi'An, China, Apr. 8, 2019-Apr. 12, 2019, Apr. 3, 2019 (Apr. 3, 2019), XP051707243, 7 pages, Retrieved from the Internet: URL: http://www.3gpp.org/ftp/tsg%5Fran/WG1°5FRL1/TSGR1°5F96b/Docs/R1°2D1904503°2Ezip. [retrieved on Apr. 3, 2019] Section 3.
Qualcomm Incorporated: "PDCCH Enhancements for eURLLC," 3GPP Draft, 3GPP TSG-RAN WG1 Meeting #96b, R1-1905019 PDCCH Enhancements for EURLLC, 3rd Generation Partnership Project (3gpp), Mobile Competence Centre, 650, Route Des Lucioles, F-06921, Sophia-Antipolis Cedex, France, vol. RAN WG1, No. Xi'an, China, Apr. 8, 2019-Apr. 12, 2018, Apr. 3, 2019 (Apr. 3, 2019), XP051707361, 11 pages, Retrieved from the Internet: URL: http://www.3gpp.org/ftp/tsg%5Fran/WG1°5FRL1/TSGR1°5F96b/Docs/R1°2D1905019°2Ezip [retrieved on Apr. 3, 2019] the whole document.

\* cited by examiner

CONTROL CHANNEL MONITORING CAPABILITY FOR LOW LATENCY COMMUNICATIONS

CROSS REFERENCE

This patent application claims priority to U.S. Provisional Patent Application No. 62/831,717, filed Apr. 9, 2019, entitled "CONTROL CHANNEL MONITORING CAPABILITY FOR LOW LATENCY COMMUNICATIONS," and assigned to the assignee hereof. The disclosure of the prior application is considered part of and is incorporated by reference in this patent application.

TECHNICAL FIELD

The following relates generally to wireless communications, and more specifically to control channel monitoring capability for low latency communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may configure a search space of physical downlink control channel (PDCCH) candidates to carry downlink control information (DCI) to a UE. In some implementations, the base station may configure multiple PDCCH candidates in multiple search spaces for the UE to search, and the UE may perform several channel estimations and blind decoding attempts to receive scheduled DCI. For instance, each search space may include multiple control resource sets (CORESETs) containing multiple control channel elements (CCEs). The UE may be configured to monitor one or more search candidates in the search space, and may blindly decode the one or more CCEs of the search candidate to receive the control information.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communications at a user equipment (UE). The method may include identifying a first set of physical downlink control channel (PDCCH) monitoring capabilities and a second set of PDCCH monitoring capabilities, transmitting an indication of PDCCH monitoring capabilities to a base station, where the indication includes both the first set and the second set, and receiving a configuration for one or more PDCCH monitoring occasions from the base station, where the configuration is based on the transmitted indication. The method may further include monitoring one or more search space sets, in accordance with the received configuration, for control information during the one or more PDCCH monitoring occasions, and decoding the control information within the one or more PDCCH monitoring occasions.

Another innovative aspect of the subject matter described in this disclosure can be implemented in an apparatus for wireless communications at a UE. The apparatus may include a processing system, a first interface, and a second interface. The processing system may be configured to identify a first set of PDCCH monitoring capabilities and a second set of PDCCH monitoring capabilities. The first interface may be configured to output an indication of PDCCH monitoring capabilities for transmission, where the indication includes both the first set and the second set of PDCCH monitoring capabilities. The second interface may be configured to obtain a configuration for one or more PDCCH monitoring occasions, where the configuration is based on the transmitted indication, and monitor one or more search space sets, in accordance with the obtained configuration, for control information during the one or more PDCCH monitoring occasions. The processing system may further be configured to decode the control information within the one or more PDCCH monitoring occasions.

Another innovative aspect of the subject matter described in this disclosure can be implemented in an apparatus for wireless communications at a UE. The apparatus may include means for identifying a first set of PDCCH monitoring capabilities and a second set of PDCCH monitoring capabilities, means for transmitting an indication of PDCCH monitoring capabilities to a base station, where the indication includes both the first set and the second set, and means for receiving a configuration for one or more PDCCH monitoring occasions from the base station, where the configuration is based on the transmitted indication. The apparatus may further include means for monitoring one or more search space sets, in accordance with the received configuration, for control information during the one or more PDCCH monitoring occasions, and means for decoding the control information within the one or more PDCCH monitoring occasions.

Another innovative aspect of the subject matter described in this disclosure can be implemented in a non-transitory computer-readable medium storing code for wireless communications at a UE. The code may include instructions executable by a processor to identify a first set of PDCCH monitoring capabilities and a second set of PDCCH monitoring capabilities, transmit an indication of PDCCH monitoring capabilities to a base station, where the indication includes both the first set and the second set of PDCCH monitoring capabilities, and receive a configuration for one or more PDCCH monitoring occasions from the base station, where the configuration is based on the transmitted indication. The code may further include instructions executable by a processor to monitor one or more search space sets, in accordance with the received configuration, for control information during the one or more PDCCH monitoring occasions, and decode the control information within the one or more PDCCH monitoring occasions.

In some implementations of the method, apparatuses, and non-transitory computer-readable medium described herein, the PDCCH monitoring capability information includes a number of control channel elements (CCEs) per slot, a number of CCEs per PDCCH monitoring span, a number of blind decodes (BDs), a number of monitorable downlink control information (DCI) formats, or some combination thereof.

In some implementations of the method, apparatuses, and non-transitory computer-readable medium described herein, the first set of PDCCH monitoring capabilities and the second set of PDCCH monitoring capabilities may be associated with a service type, a number of DCI formats, or some combination thereof.

In some implementations, the method, apparatuses, and non-transitory computer-readable medium described herein may further include operations, features, means, or instructions for identifying one or more component carriers in a band or band combination that may be supported for each of the first set of PDCCH monitoring capabilities and the second set of PDCCH monitoring capabilities, where the indication includes the one or more component carriers in the band or band combination that may be supported for each of the first set and the second set.

In some implementations of the method, apparatuses, and non-transitory computer-readable medium described herein, the received configuration includes a first configuration for a first set of PDCCH monitoring occasions based on the first set of PDCCH monitoring capabilities, a second configuration for a second set of PDCCH monitoring occasions based on the second set of PDCCH monitoring capabilities, or both.

In some implementations of the method, apparatuses, and non-transitory computer-readable medium described herein, the first configuration and the second configuration indicate two or more monitoring occasions or two or more monitoring spans that collide in time.

In some implementations, the method, apparatuses, and non-transitory computer-readable medium described herein may further include operations, features, means, or instructions for monitoring for one or more DCI formats associated with each of the two or more monitoring occasions or the two or more monitoring spans that collide in time during the two or more monitoring occasions or the two or more monitoring spans.

In some implementations, the method, apparatuses, and non-transitory computer-readable medium described herein may further include operations, features, means, or instructions for identifying a number of multiple input multiple output (MIMO) layers, a transport block size, a number of resource blocks (RBs), a processing timing parameter, or some combination thereof, that may be supported for each of the first set of PDCCH monitoring capabilities and the second set of PDCCH monitoring capabilities, where the indication includes the number of MIMO layers, the transport block size, the number of RBs, the processing timing parameter, or some combination thereof, that may be supported for each of the first set and the second set.

In some implementations, the method, apparatuses, and non-transitory computer-readable medium described herein may further include operations, features, means, or instructions for identifying a band or band combination associated with a first PDCCH monitoring occasion, and identifying PDCCH monitoring capability information based on the band or band combination, where the indication includes the PDCCH monitoring capability information.

In some implementations, the method, apparatuses, and non-transitory computer-readable medium described herein may further include operations, features, means, or instructions for identifying PDCCH monitoring capability information based on a minimum time separation between the start of two spans, a maximum span length in which PDCCH may be configured to be monitored with same start symbol, a carrier aggregation capability, a MIMO capability, shared channel limitations, processing power capability, or some combination thereof, where the indication includes the PDCCH monitoring capability information.

In some implementations of the method, apparatuses, and non-transitory computer-readable medium described herein, the PDCCH monitoring capability information includes a number of CCEs supported per PDCCH monitoring occasion, a number of BDs supported per PDCCH monitoring occasion, or both.

In some implementations of the method, apparatuses, and non-transitory computer-readable medium described herein, the configuration includes, for each of the one or more PDCCH monitoring occasions, an identification parameter associated with the base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more DCI formats, an identification parameter associated with one or more service types, an identification parameter associated with one or more UE PDCCH monitoring capabilities, or any combination thereof.

Another innovative aspect of the subject matter described in this disclosure can be implemented in a method of wireless communications at a base station. The method may include receiving an indication of UE PDCCH monitoring capabilities from a UE, identifying a first set of UE PDCCH monitoring capabilities and a second set of UE PDCCH monitoring capabilities based on the indication, determining a configuration for one or more PDCCH monitoring occasions, where the configuration is based on the received indication, transmitting the configuration to the UE, and transmitting, in accordance with the transmitted configuration, control information during the one or more PDCCH monitoring occasions.

Another innovative aspect of the subject matter described in this disclosure can be implemented in an apparatus for wireless communications at a base station. The apparatus may include a processing system, a first interface, and a second interface. The first interface may be configured to obtain an indication of UE PDCCH monitoring capabilities, the processing system may be configured to identify a first set of UE PDCCH monitoring capabilities and a second set of UE PDCCH monitoring capabilities based on the obtained indication and determine a configuration for one or more PDCCH monitoring occasions, where the configuration is based on the received indication. The second interface may be configured to output the configuration for transmission, and output, in accordance with the transmitted configuration, control information during the one or more PDCCH monitoring occasions.

Another innovative aspect of the subject matter described in this disclosure can be implemented in an apparatus for wireless communications at a base station. The apparatus may include means for receiving an indication of UE PDCCH monitoring capabilities from a UE, means for identifying a first set of UE PDCCH monitoring capabilities and a second set of UE PDCCH monitoring capabilities based on the indication, means for determining a configuration for one or more PDCCH monitoring occasions, where the configuration is based on the received indication, means for transmitting the configuration to the UE, and means for transmitting, in accordance with the transmitted configuration, control information during the one or more PDCCH monitoring occasions.

Another innovative aspect of the subject matter described in this disclosure can be implemented in a non-transitory computer-readable medium storing code for wireless communications at a base station. The code may include instructions executable by a processor to receive an indication of UE PDCCH monitoring capabilities from a UE, identify a first set of PDCCH monitoring capabilities and a second set of PDCCH monitoring capabilities, determine a configuration for one or more PDCCH monitoring occasions, where the configuration is based on the received indication, transmit the configuration to the UE, and transmit, in accordance with the transmitted configuration, control information during the one or more PDCCH monitoring occasions.

In some implementations, the method, apparatuses, and non-transitory computer-readable medium described herein may further include operations, features, means, or instructions for identifying UE PDCCH monitoring capability information based on the received indication, where the configuration for one or more PDCCH monitoring occasions may be determined based on the UE PDCCH monitoring capability information.

In some implementations of the method, apparatuses, and non-transitory computer-readable medium described herein, the UE PDCCH monitoring capability information includes a number of CCEs per slot, a number of CCEs per PDCCH monitoring span, a number of CCEs supported per PDCCH monitoring occasion, a number of BDs supported per PDCCH monitoring occasion, a number of monitorable DCI formats, or some combination thereof.

In some implementations of the method, apparatuses, and non-transitory computer-readable medium described herein, the UE PDCCH monitoring capability information includes a minimum time separation between the start of two spans, a maximum span length in which PDCCH may be configured to be monitored with same start symbol, a carrier aggregation capability, a MIMO capability, shared channel limitations, processing power capability, or some combination thereof.

In some implementations, the method, apparatuses, and non-transitory computer-readable medium described herein may further include operations, features, means, or instructions for identifying a first set of UE PDCCH monitoring capabilities and a second set of UE PDCCH monitoring capabilities based on the received indication.

In some implementations, the method, apparatuses, and non-transitory computer-readable medium described herein may further include operations, features, means, or instructions for determining a first configuration for a first set of one or more PDCCH monitoring occasions based on the first set of UE PDCCH monitoring capabilities, and determining a second configuration for a second set of one or more PDCCH monitoring occasions based on the second set of UE PDCCH monitoring capabilities, where the configuration transmitted to the UE includes the first configuration and the second configuration.

In some implementations of the method, apparatuses, and non-transitory computer-readable medium described herein, the first set of UE PDCCH monitoring capabilities and the second set of UE PDCCH monitoring capabilities may be each associated with a service type, a number of DCI formats, or some combination thereof.

In some implementations of the method, apparatuses, and non-transitory computer-readable medium described herein, the first set of UE PDCCH monitoring capabilities and the second set of UE PDCCH monitoring capabilities may be each associated with one or more component carriers in a band or band combination.

In some implementations, the method, apparatuses, and non-transitory computer-readable medium described herein may further include operations, features, means, or instructions for identifying two or more monitoring occasions or two or more monitoring spans that collide in time, where the configuration may be determined based on the first set of UE PDCCH monitoring capabilities, the second set of UE PDCCH monitoring capabilities, and the identification that two or more monitoring occasions or two or more monitoring spans that collide in time.

In some implementations, the method, apparatuses, and non-transitory computer-readable medium described herein may further include operations, features, means, or instructions for identifying a number of MIMO layers, a transport block size, a number of RBs, a processing timing parameter, or some combination thereof, that may be supported by the UE for each of the first set of PDCCH monitoring capabilities and the second set of PDCCH monitoring capabilities based on the received indication.

In some implementations of the method, apparatuses, and non-transitory computer-readable medium described herein, determining the configuration for one or more PDCCH monitoring occasions may include operations, features, means, or instructions for determining, for each of the one or more PDCCH monitoring occasions, an identification parameter associated with the base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more DCI formats, an identification parameter associated with one or more service types, an identification parameter associated with one or more UE PDCCH monitoring capabilities, or any combination thereof.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
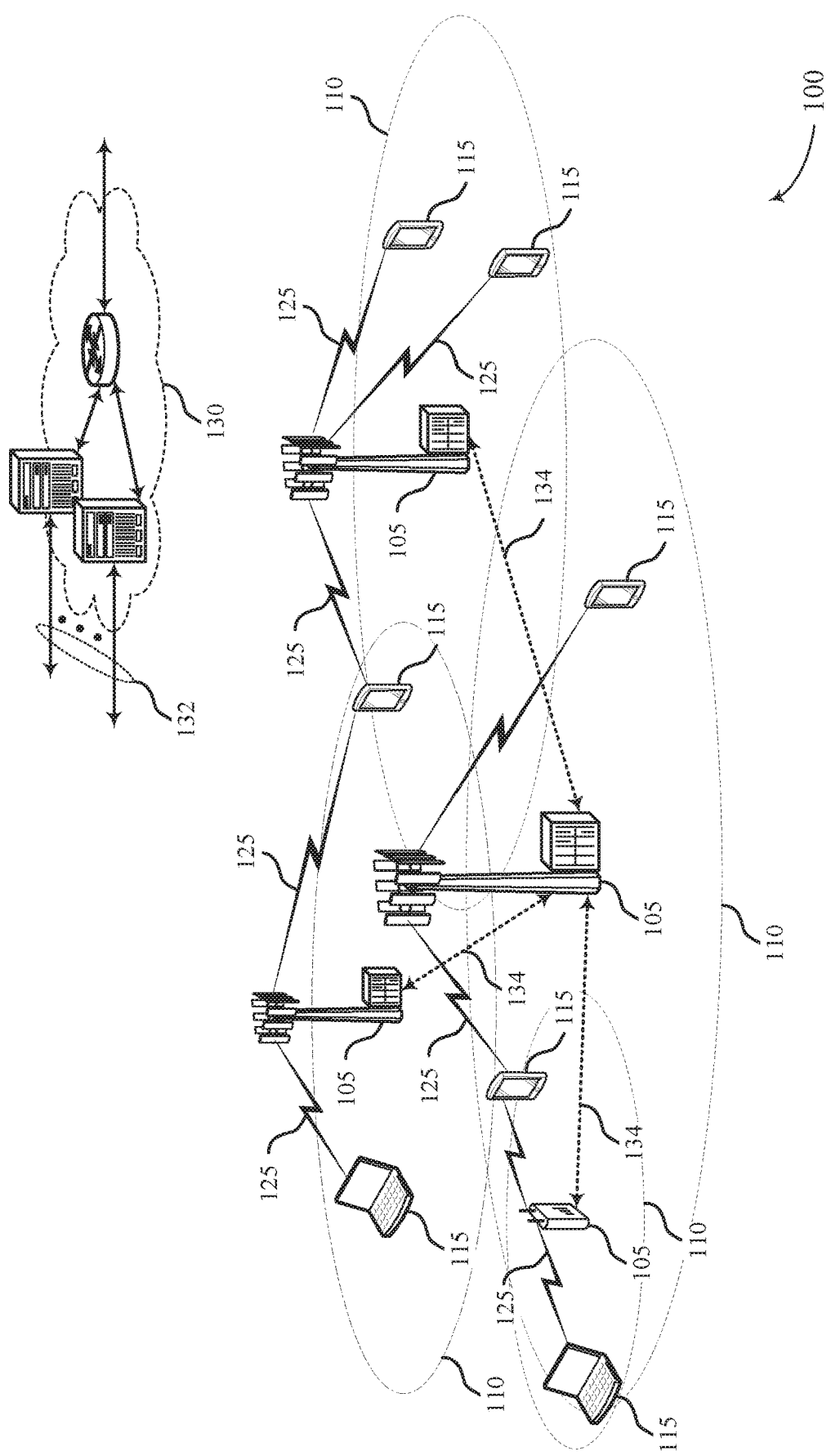
FIG. 1 illustrates an example of a wireless communications system that supports control channel monitoring capability for low latency communications.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO. EV-DO Rev A. EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a base station may configure a search space set for transmission of downlink control information (DCI) to a user equipment (UE). The search space set may include a number of physical downlink control channel (PDCCH) blind decoding candidates at multiple aggregation levels (ALs). In some implementations, the base station may configure multiple search space sets for transmission of DCI to the UE within a control resource set (CORESET). Additionally, the base station may configure multiple CORESETs within a same slot (such as in each slot) for the UE. A base station may configure one or more monitoring occasions, where each monitoring occasion may be defined as the number of consecutive symbols where the UE monitors different search space sets of different CORESETs. According to the described techniques, a UE may indicate different PDCCH monitoring capabilities (such as UE capabilities in terms of the number of control channel elements (CCEs), blind decodes (BDs), number of DCIs, etc.) per monitoring span or slot. For example, a UE may support a different number of CCEs per slot or a different number of DCIs per monitoring span for different service types (such as a different number of CCEs for enhanced mobile broadband (eMBB) or other low priority channel scheduling/procedure and for ultra-reliable low latency communications (URLLC) or high priority channel scheduling/procedure).

A UE may thus indicate different sets of PDCCH monitoring capabilities (such as sets of PDCCH monitoring capabilities for different service types, monitoring spans, slots, etc.). In some implementations, a UE may indicate a number of component carriers (CCs) in a given band or band combination when a certain set of PDCCH monitoring capabilities is supported. For example, a UE may support a first set of PDCCH monitoring capabilities (such as some PDCCH capability 1) on a first set of CCs and a second set of PDCCH monitoring capabilities (such as some PDCCH capability 2) on a second set of CCs. Additionally, or alternatively, a UE may report, per capability (such as for one or more set of capabilities), a number of multiple input multiple output (MIMO) layers, a transport block size (TBS), a number of resource blocks (RBs), the processing timing, etc. For example, the UE may report a number of MIMO layers, a TBS, a number of RBs, etc., for each of PDCCH capability 1 and PDCCH capability 2. A base station may receive the indication of UE PDCCH monitoring capability information, and may configure the UE with one or more monitoring occasions accordingly.

Particular implementations of the subject matter described in this disclosure may be implemented to realize one or more of the following potential advantages. Specifically, the techniques described for indication of control channel monitoring capabilities may improve configuration and efficiency of PDCCH monitoring occasions. For instance, a base station may configure PDCCH monitoring occasions according to received UE PDCCH monitoring capability information to efficiently balance trade-offs in CCE density, number of blind decoding candidates, scheduling delay for control information, etc. For example, for enhanced URLLC operation, a UE may monitor for PDCCH transmissions in multiple monitoring occasions within a slot to reduce the scheduling delay for control information. Based on the monitoring occasion configuration (such as the density of CCEs, blind decoding candidates, etc., of a monitoring occasion), a UE may not be able to process the fast CCEs, blind decoding candidates, or both according to a fast processing timeline for URLLC. Alternatively, for eMBB operation, a UE may be able to handle a larger number of PDCCH candidates in a monitoring occasion or a larger number of CCEs for channel estimation in a symbol. As such, a base station may consider UE PDCCH monitoring capability information (such as different UE sets of PDCCH monitoring capabilities) to configure one or more monitoring occasions or a span pattern (such as the pattern of PDCCH instances over a set of resources), which may provide for improved DCI signaling for URLLC operation, eMBB operation, etc. Additionally, or alternatively, a UE may be configured to support different sets of PDCCH configurations based on the reported capability of the UE, and the different sets of PDCCH configurations may be applied or configured for different services.

FIG. 1 illustrates an example of a wireless communications system 100 that supports control channel monitoring capability for low latency communications. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, or communications with low-cost and low-complexity devices.

The base stations 105 may wirelessly communicate with the UEs 115 via one or more base station antennas. The base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. The wireless communications system 100 may include base stations 105 of different types (such as macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and the communication links 125 between a base station 105 and a UE 115 may utilize one or more carriers. The communication links 125 shown in the wireless communications system 100 may include uplink transmissions from a UE 115 to a base station 105, or downlink transmissions from a base station 105 to a UE 115. Downlink transmissions also may be called forward link transmissions while uplink transmissions also may be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and may therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as over a carrier), and may be associated with an identifier for distinguishing neighboring cells (such as a physical cell identifier (PCID), a virtual cell identifier (VCID)) operating via the same or a different carrier. In some examples, a carrier may support multiple cells, and different cells may be configured according to different protocol types (such as machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (such as a sector) over which the logical entity operates.

The UEs 115 may be dispersed throughout the wireless communications system 100, and each UE 115 may be stationary or mobile. A UE 115 also may be referred to as a mobile device, a wireless device, a remote device, a hand-held device, or a subscriber device, or some other suitable terminology, where the "device" also may be referred to as a unit, a station, a terminal, or a client. A UE 115 also may be a personal electronic device such as a cellular phone, a personal digital assistant (PDA), a tablet computer, a laptop computer, or a personal computer. In some examples, a UE 115 also may refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (such as via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples half-duplex communications may be performed at a reduced peak rate. Other power conservation techniques for the UEs 115 include entering a power saving "deep sleep" mode when not engaging in active communications, or operating over a limited bandwidth (such as according to narrowband communications). In some implementations, the UEs 115 may be designed to support critical functions (such as mission critical functions), and a wireless communications system 100 may be configured to provide ultra-reliable communications for these functions.

In some implementations, a UE 115 also may be able to communicate directly with other UEs 115 (such as using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other implementations, D2D communications are carried out between UEs 115 without the involvement of a base station 105.

The base stations 105 may communicate with the core network 130 and with one another. For example, the base stations 105 may interface with the core network 130 through backhaul links 132 (such as via an S1, N2, N3, or another interface). The base stations 105 may communicate with one another over backhaul links 134 (such as via an X2, Xn, or other interface) either directly (such as directly between the base stations 105) or indirectly (such as via the core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with the UEs 115 through a number of other access network transmission entities, which may be referred to as a radio head, a smart radio head, or a transmission/reception point (TRP). In some configurations, various functions of each access network entity or base station 105 may be distributed across various network devices (such as radio heads and access network controllers) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as less than 100 km) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

The wireless communications system 100 also may operate in an extremely high frequency (EHF) region of the spectrum (such as from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, the wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (such as LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, a base station 105 or a UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (such as a base station 105) and a receiving device (such as a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which also may be referred to as spatial filtering, directional transmission, or directional reception, is a signal processing technique that may be used at a transmitting device or a receiving device (such as a base station 105 or a UE 115) to shape or steer an antenna beam (such as a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (such as with respect to the antenna array of the transmitting device or receiving device, or with respect to some other orientation).

In one example, a base station 105 may use multiple antennas or antenna arrays to conduct beamforming operations for directional communications with a UE 115. For instance, some signals (such as synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as by the base station 105 or a receiving device, such as a UE 115) a beam direction for subsequent transmission or reception by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as for identifying a beam direction for subsequent transmission or reception by the UE 115), or transmitting a signal in a single direction (such as for transmitting data to a receiving device).

A receiving device (such as a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (such as when receiving a data signal). The single receive beam may be aligned in a beam direction determined based at least in part on listening according to different receive beam directions (such as a beam direction determined to have a highest signal strength, highest signal-to-noise ratio, or otherwise acceptable signal quality based at least in part on listening according to multiple beam directions).

In some implementations, the antennas of a base station 105 or a UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as signal-to-noise conditions). In some implementations, a wireless device may support same-slot HARQ feedback, where the device may provide HARQ feedback in a specific slot for data received in a previous symbol in the slot. In other implementations, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other implementations, a smallest scheduling unit of the wireless communications system 100 may be shorter than a subframe or may be dynamically selected (such as in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and abase station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (such as an evolved universal mobile telecommunication system terrestrial radio access (E-UTRA) absolute radio frequency channel number (EARFCN)), and may be positioned according to a channel raster for discovery by UEs 115. Carriers may be downlink or uplink (such as in an FDD mode), or be configured to carry downlink and uplink communications (such as in a TDD mode). In some examples, signal waveforms transmitted over a carrier may be made up of multiple sub-carriers (such as using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as LTE, LTE-A, LTE-A Pro, NR). For example, communications over a carrier may be organized according to TTIs or slots, each of which may include user data as well as control information or signaling to support decoding the user data. A carrier also may include dedicated acquisition signaling (such as synchronization signals or system information, etc.) and control signaling that coordinates operation for the carrier. In some examples (such as in a carrier aggregation configuration), a carrier also may have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (such as between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (such as 1.4, 3, 5, 10, 15, 20, 40, or 80 MHz). In some examples, each served UE 115 may be configured for operating over portions or all of the carrier bandwidth. In some other examples, some UEs 115 may be configured for operation using a narrowband protocol type that is associated with a predefined portion or range (such as set of subcarriers or RBs) within a carrier (such as "in-band" deployment of a narrowband protocol type).

In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as spatial layers), and the use of multiple spatial layers may further increase the data rate for communications with a UE 115.

Devices of the wireless communications system 100 (such as base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

The wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (such as when multiple serving cells have a suboptimal or non-ideal backhaul link). An eCC also may be configured for use in unlicensed spectrum or shared spectrum (such as where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or a base station 105, utilizing eCCs may transmit wideband signals (such as according to frequency channel or carrier bandwidths of 20, 40, 60, 80 MHz, etc.) at reduced symbol durations (such as 16.67 microseconds). A TTI in eCC may consist of one or multiple symbol periods. In some implementations, the TI duration (that is, the number of symbol periods in a TTI) may be variable.

The wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (such as across the frequency domain) and horizontal (such as across the time domain) sharing of resources.

In some wireless communications systems 100, a base station 105 may configure a search space set for transmission of DCI to a UE 115. The search space set may include a number of PDCCH blind decoding candidates at multiple ALs. In some implementations, the base station 105 may configure multiple search space sets for transmission of DCI to the UE 115 within a single CORESET. In some implementations, the base station 105 may configure multiple CORESETs within a same slot for the UE 115. In some implementations, while search space sets for a same CORESET may not overlap in time, search space sets for different CORESETs may partially or fully overlap for one or more symbols in a slot. In some aspects, a base station 105 may configure a PDCCH for a UE according to different span patterns such as the pattern of PDCCH transmissions or occasions over a set of time-frequency resources. Different span patterns may have different CCE or BD configurations that support different numbers of non-overlapping CCEs or BDs. Further, a given span pattern may support a given number of non-overlapping CCEs or BDs such as a maximum or a minimum number of CCEs or BDs.

A UE 115 may indicate different PDCCH monitoring capabilities (such as UE capabilities in terms of the number of CCEs, BDs, number of DCI formats, etc.) per monitoring span or slot. For example, a UE 115 may support a different number of CCEs per slot or a different number of DCIs per monitoring span for different service types (such as a different number of CCEs for eMBB or other low priority channel scheduling/procedures and for URLLC or other high priority channel scheduling/procedures). A UE 115 may thus indicate different sets of PDCCH monitoring capabilities (such as sets of PDCCH monitoring capabilities for different service types, monitoring spans, slots, etc.). In some implementations, a UE 115 may indicate a number of CCs in a given band or band combination when a certain set of PDCCH monitoring capabilities is supported. For example, a UE 115 may support a first set of PDCCH monitoring capabilities (such as some PDCCH capability 1) on a first set of CCs and a second set of PDCCH monitoring capabilities (such as some PDCCH capability 2) on a second set of CCs. Additionally, or alternatively, a UE 115 may report, per capability (such as for one or more sets of capabilities or span pattern), a number of MIMO layers, a TBS, a number of RBs, the processing timing, etc. For example, the UE 115 may report a number of MIMO layers, a TBS, a number of RBs, etc., for each of PDCCH capability 1 and PDCCH capability 2. A base station 105 may receive the indication of UE PDCCH monitoring capability information, and may configure the UE 115 with one or more monitoring occasions or a span pattern accordingly.

Figure 2:
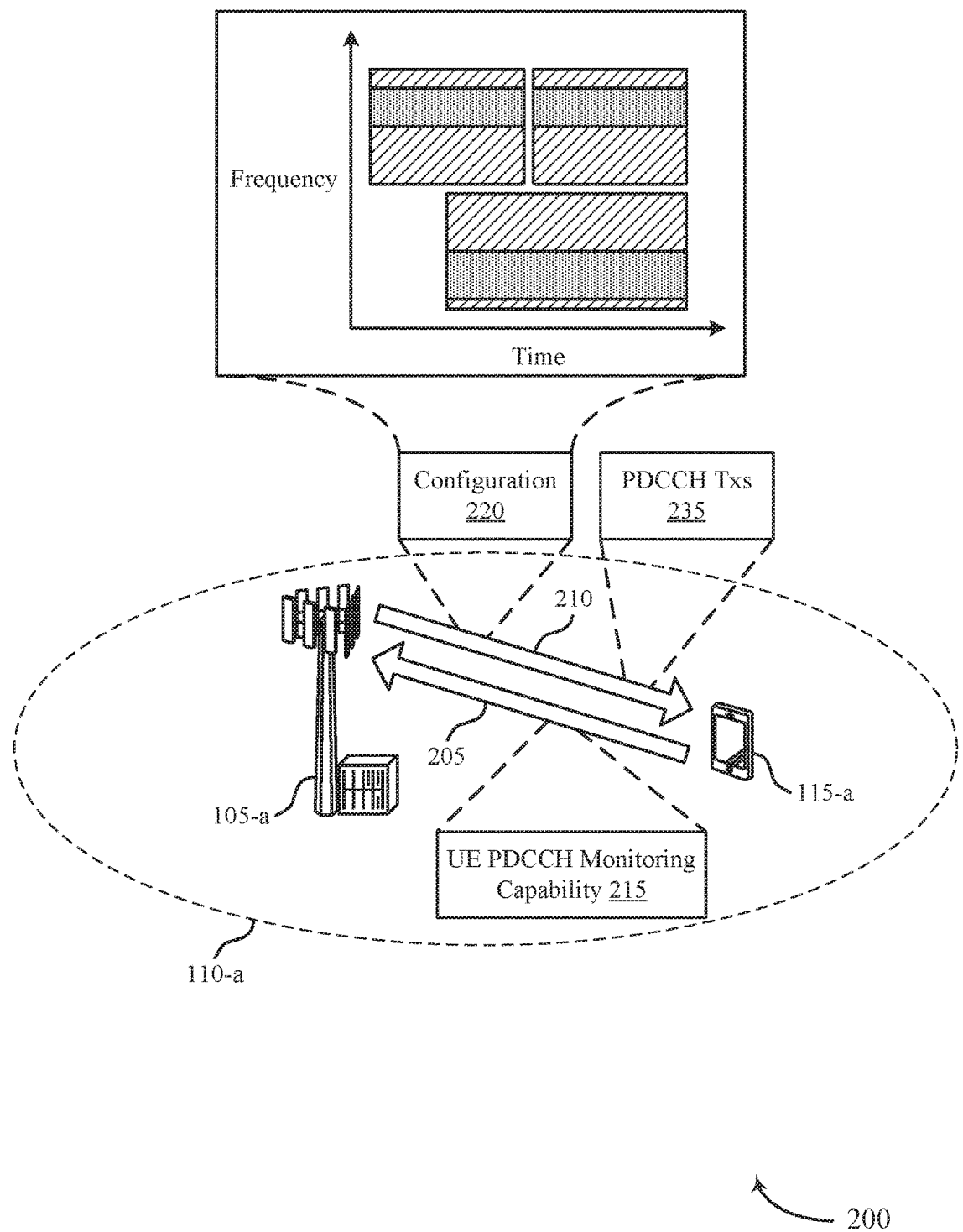
FIG. 2 illustrates an example of a wireless communications system that supports control channel monitoring capability for low latency communications.

FIG. 2 illustrates an example of a wireless communications system 200 that supports control channel monitoring capability for low latency communications. In some examples, the wireless communications system 200 may implement aspects of the wireless communications system 100. The wireless communications system 200 may include a base station 105-*a* and a UE 115-*a*, which may be examples of the corresponding devices described with reference to FIG. 1. In some examples, the UE 115-*a* may operate according to different service types (which may be referred to as communication types, service requirements, operation modes, etc.), such as a URLLC service type, an eMBB service type, etc. For example, the UE 115-*a* may be configured with various priority channel scheduling/procedures (such as URLLC or eMBB).

A high priority service type or a UE 115-*a* configured with URLLC may operate according to or may support reduced processing timelines for HARQ reporting, PUSCH preparation, CSI computation, etc. In some implementations, the UE 115-*a* may indicate URLLC associated UE PDCCH monitoring capabilities 215 to the base station 105-*a* (such as via an uplink channel 205). The base station 105-*a* may configure the UE 115-*a* according to the indicated UE PDCCH monitoring capabilities 215. For example, to support one or more of these low latency processing timelines, the base station 105-*a* may determine and convey a configuration 220 with a reduced number of CCEs, in accordance with specified PDCCH monitoring capabilities 215, for the UE 115-*a* to perform channel estimation on and the number of blind decoding processes for the UE 115-*a* to perform when attempting to detect and decode a PDCCH transmission 235 from the base station 105-*a* (such as on the downlink channel 210). Such configurations 220 may support fast blind decoding of the PDCCH transmissions 235. In some implementations, these limits may be applied per slot. For example, for a subcarrier spacing (SCS) of 30 kilohertz (kHz), the UE 115-*a* may perform channel estimation for a maximum of 56 non-overlapping CCEs in a single slot.

For enhanced URLLC operation, the UE 115-*a* may monitor for PDCCH transmissions in multiple monitoring occasions within a slot to reduce the scheduling delay for control information. Based on the density of these CCEs, blind decoding candidates, or both, the UE 115-*a* may not be able to process the CCEs, blind decoding candidates, or both according to the fast processing timeline for URLLC. As such, the UE 115-*a* may convey an indication of UE PDCCH monitoring capabilities 215 to indicate a number of CCEs, a number of BDs, processing timeline information, etc., associated with monitoring occasions corresponding to URLLC operation. The base station 105-*a* may receive the indication, and may determine a configuration 220 for one or more monitoring occasions or span pattern based on the UE PDCCH monitoring capabilities 215.

That is, the UE 115-*a* may be configured with one or more CORESETs 225 for receiving control information (such as DCI in PDCCH transmissions 235). Each CORESET 225 may be associated with one or more search space sets 230. In some implementations, the base station 105-*a* may transmit a configuration 220 to the UE 115-*a* to configure the CORESETs 225 and search space sets 230 for the UE 115-*a*. This configuration 220 may be based on the UE PDCCH monitoring capabilities 215 of the UE 115-*a*. For example, as discussed herein, the UE 115-*a* may identify one or more sets of UE PDCCH monitoring capabilities 215 (such as sets of UE PDCCH monitoring capabilities for different service types, UE processing timelines, etc.), and may transmit and indication of UE PDCCH monitoring capabilities 215 to the base station 105-*a*. The UE 115-*a* may thus operate according to an appropriate processing timeline, as the base station 105-*a* may configure the UE 115-*a* with configurations 220 that appropriately account for UE PDCCH monitoring capabilities 215. Configurations 220, such as the density of CCEs for channel estimation, the density of blind decoding candidates in a monitoring occasion etc., may be determined based on UE PDCCH monitoring capabilities 215.

Figure 3:
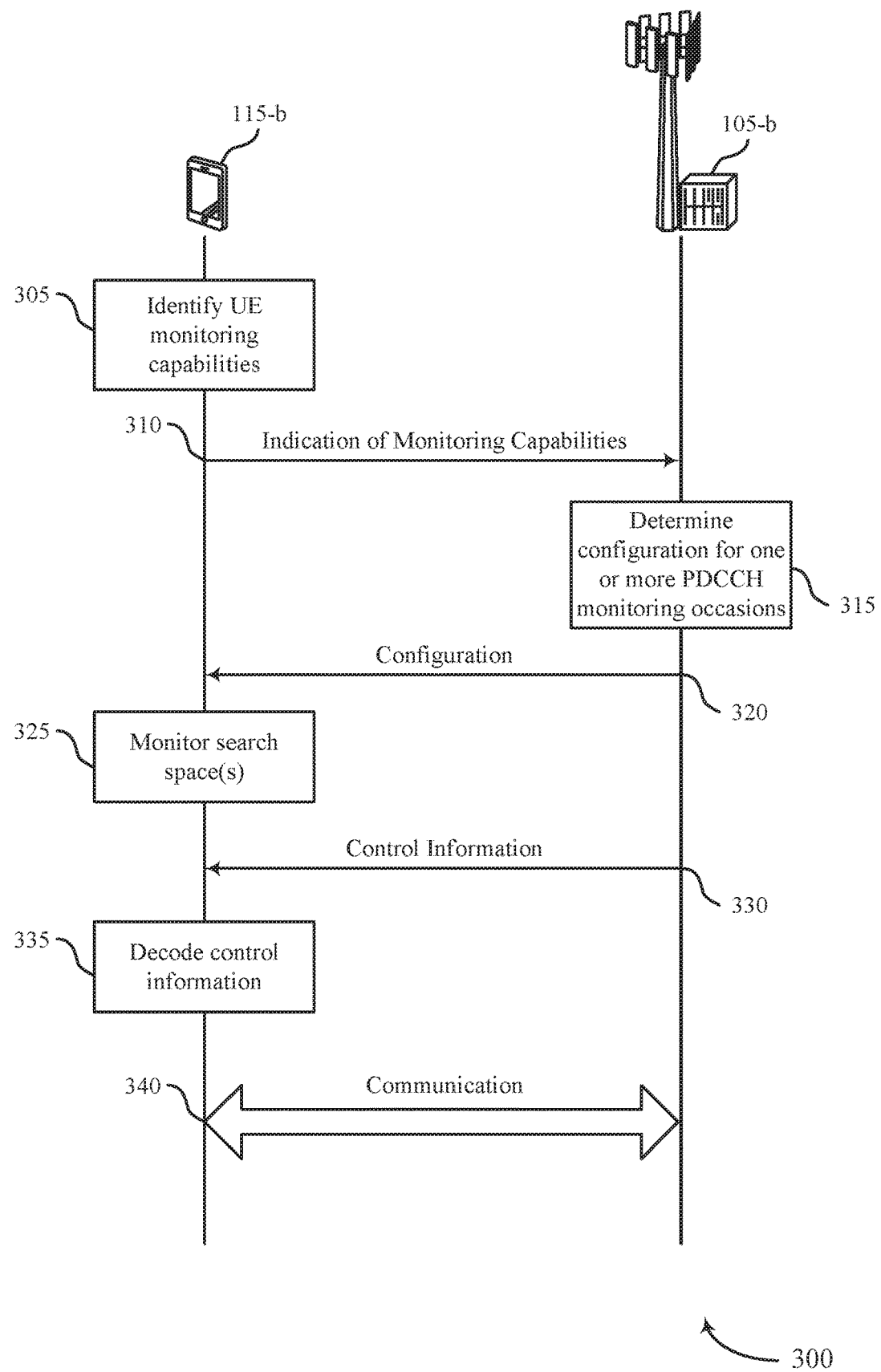
FIG. 3 illustrates an example of a process flow that supports control channel monitoring capability for low latency communications.

FIG. 3 illustrates an example of a process flow that supports control channel monitoring capability for low latency communications. In some examples, process flow 300 may implement aspects of wireless communications system 100. Further, process flow 300 may be implemented by a UE 115-*b* and a base station 105-*b*, which may be examples of a UE 115 and a base station 105 described with reference to FIGS. 1 and 2. In the following description of the process flow 300, the operations between the UE 115-*b* and the base station 105-*b* may be transmitted in a different order than the order shown, or the operations performed by the base station 105-*b* and the UE 115-*b* may be performed in different orders or at different times. Certain operations also may be left out of the process flow 300, or other operations may be added to the process flow 300. It is to be understood that while the base station 105-*b* and the UE 115-*b* are shown performing a number of the operations of process flow 300, any wireless device may perform the operations shown.

At 305, the UE 115-*b* may identify UE monitoring capabilities for the UE 115-*b*. In some implementations, the UE 115-*b* may identify a first set of PDCCH monitoring capabilities and a second set of PDCCH monitoring capabilities where the first set of PDCCH monitoring capabilities and the second set of PDCCH monitoring capabilities are associated with a service type, a number of DCI formats, or some combination thereof. In some examples, the UE 115-*b* may identify a service type associated with a first PDCCH monitoring occasion and identify PDCCH monitoring capability information based at least in part on the service type. In some aspects, the PDCCH monitoring capability information may include a number of CCEs per slot, a number of CCEs per PDCCH monitoring span, a number of BDs, a number of monitorable DCI formats, or some combination thereof. In some implementations, identifying PDCCH monitoring capability information may be based at least in part on a minimum time separation (of X OFDM symbols, including the cross-slot boundary implementation) between the start of two spans, a maximum span length (Y consecutive OFDM symbols) in which the PDCCH is configured to be monitored with the same start symbol, a carrier aggregation capability, a MIMO capability, shared channel limitations, processing power capability, or some combination thereof, where the indication includes the PDCCH monitoring capability information. In some implementations, the first set of UE PDCCH monitoring capabilities and the second set of UE PDCCH monitoring capabilities are each associated with one or more component carriers in a band or band combination.

At 310, the UE 115-*b* may transmit, and the base station 105-*b* may receive, an indication of the UE monitoring capabilities identified at 305. In some examples, the indication may include both the first set and the second set of PDCCH monitoring capabilities.

At 315, the base station 105-*b* may determine a configuration for one or more PDCCH monitoring occasions. In some examples, the base station 105-*b* may identify UE PDCCH monitoring capability information based at least in part on the indication received at 310 and the configuration for one or more PDCCH monitoring occasions may be determined based at least in part on the UE PDCCH monitoring capability information. In some implementations, the base station 105-*b* may determine a first configuration for a first set of one or more PDCCH monitoring occasions based at least in part on the first set of UE PDCCH monitoring capabilities and determine a second configuration for a second set of one or more PDCCH monitoring occasions based at least in part on the second set of UE PDCCH monitoring capabilities, where the configuration transmitted to the UE includes the first configuration and the second configuration. In some aspects, the configuration includes, for each of the one or more PDCCH monitoring occasions, an identification parameter associated with the base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more DCI formats, an identification parameter associated with one or more service types, an identification parameter associated with one or more UE PDCCH monitoring capabilities, or any combination thereof.

At 320, the base station 105-*b* may transmit, and the UE 115-*b* may receive, an indication of the configuration determined by the base station 105-*b* at 315. In some implementations, the indication of the configuration may include a first configuration for a first set of PDCCH monitoring occasions based at least in part on the first set of PDCCH monitoring capabilities, a second configuration for a second set of PDCCH monitoring occasions based at least in part on the second set of PDCCH monitoring capabilities, or both. In some implementations, the first configuration and the second configuration indicate two or more monitoring occasions or two or more monitoring spans that collide in time.

At 325, the UE 115-*b* may monitor one or more search space(s) (such as one or more search space sets), in accordance with the received configuration, for control information during the one or more PDCCH monitoring occasions. In some implementations, the UE 115-*b* may monitor for one or more DC formats associated with each of the two or more monitoring occasions or the two or more monitoring spans that collide in time during the two or more monitoring occasions or the two or more monitoring spans.

At 330, the base station 105-*b* may transmit, in accordance with the transmitted configuration, control information during the one or more PDCCH monitoring occasions.

At 335, the UE 115-*b* may decode the control information transmitted by the base station at 330 based on the monitoring. In some implementations the UE may decode the control information within the one or more PDCCH monitoring occasions.

At 340, based on the decoded control information, the UE 115-*b* may communicate with base station 105-*b*.

Figure 4:
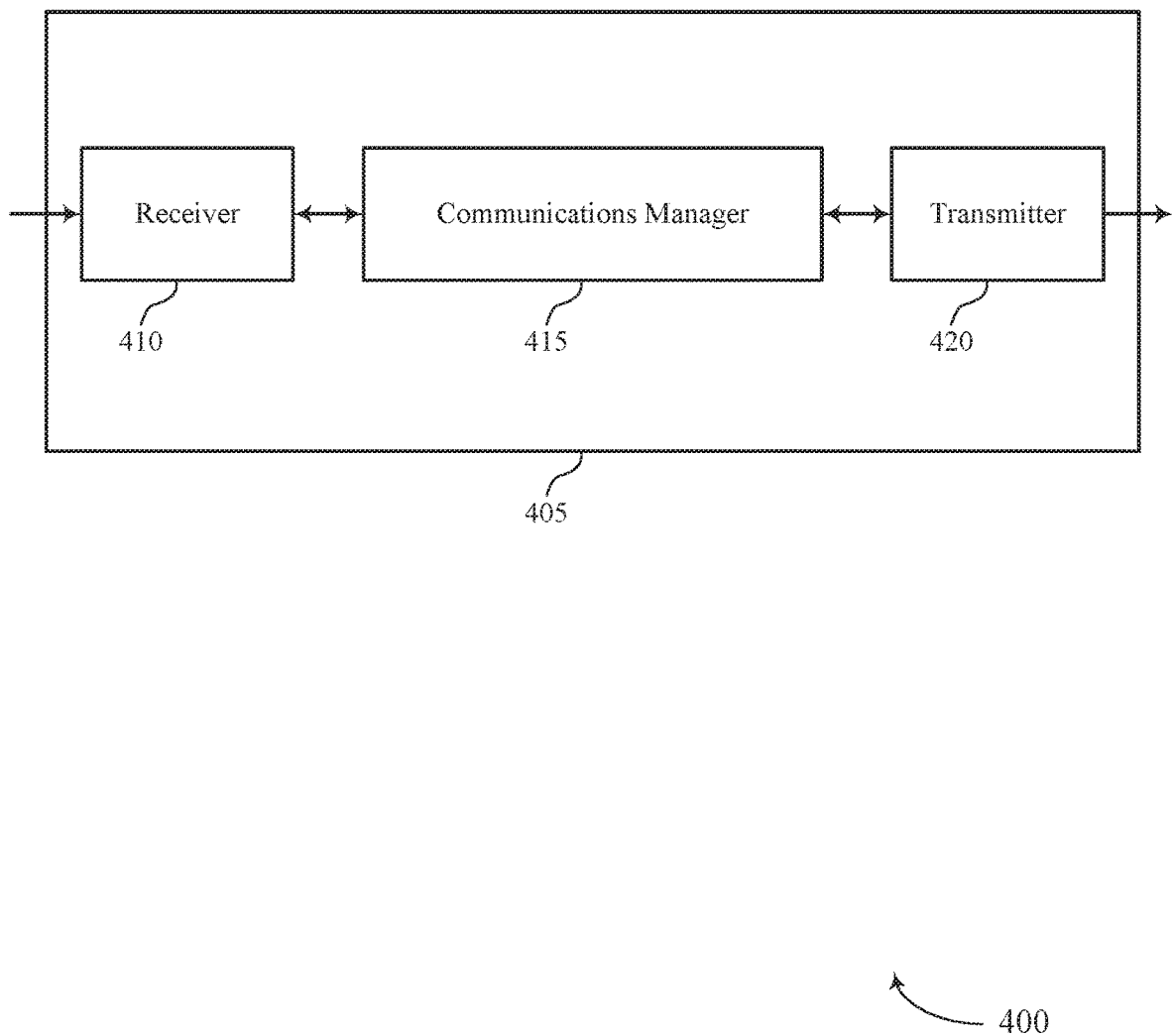
FIGS. 4 and 5 show block diagrams of example devices that support control channel monitoring capability for low latency communications.

FIG. 4 shows a block diagram of an example device that supports control channel monitoring capability for low latency communications. The device 405 may be an example of aspects of a UE 115 as described herein. The device 405 may include a receiver 410, a communications manager 415, and a transmitter 420. The device 405 also may include a processor. Each of these components may be in communication with one another (such as via one or more buses).

The receiver 410 may receive information such as packets, user data, or control information associated with various information channels (such as control channels, data channels, and information related to control channel monitoring capability for low latency communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit an indication of PDCCH monitoring capabilities to a base station, receive a configuration for one or more PDCCH monitoring occasions from the base station, where the configuration is based on the transmitted indication, monitor one or more search space sets, in accordance with the received configuration, for control information during the one or more PDCCH monitoring occasions, and decode the control information within the one or more PDCCH monitoring occasions. The communications manager 415 may be an example of aspects of the communications manager 710 described herein.

The communications manager 415, or its sub-components, may be implemented in hardware, code (such as software or firmware) executed by a processor, or any combination thereof. If implemented in code executed by a processor, the functions of the communications manager 415 or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
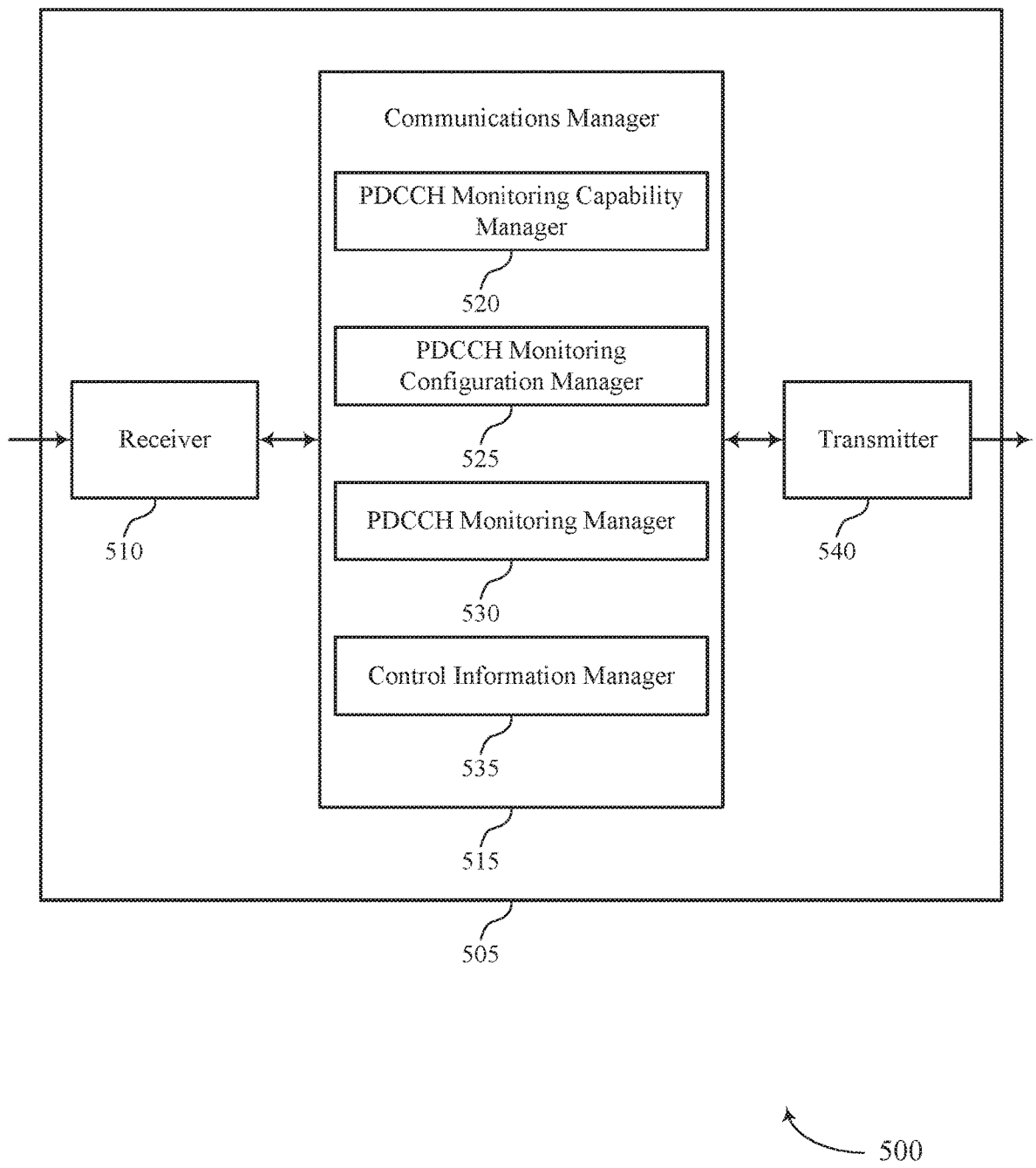

FIG. 5 shows a block diagram of an example device that supports control channel monitoring capability for low latency communications. The device 505 may be an example of aspects of a device 405 or a UE 115 as described herein. The device 505 may include a receiver 510, a communications manager 515, and a transmitter 540. The device 505 also may include a processor. Each of these components may be in communication with one another (such as via one or more buses).

The receiver 510 may receive information such as packets, user data, or control information associated with various information channels (such as control channels, data channels, and information related to control channel monitoring capability for low latency communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a PDCCH monitoring capability manager 520, a PDCCH monitoring configuration manager 525, a PDCCH monitoring manager 530, and a control information manager 535. The communications manager 515 may be an example of aspects of the communications manager 710 described herein.

The PDCCH monitoring capability manager 520 may transmit an indication of PDCCH monitoring capabilities to a base station.

The PDCCH monitoring configuration manager 525 may receive a configuration for one or more PDCCH monitoring occasions from the base station, where the configuration is based on the transmitted indication.

The PDCCH monitoring manager 530 may monitor one or more search space sets, in accordance with the received configuration, for control information during the one or more PDCCH monitoring occasions.

The control information manager 535 may decode the control information within the one or more PDCCH monitoring occasions.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
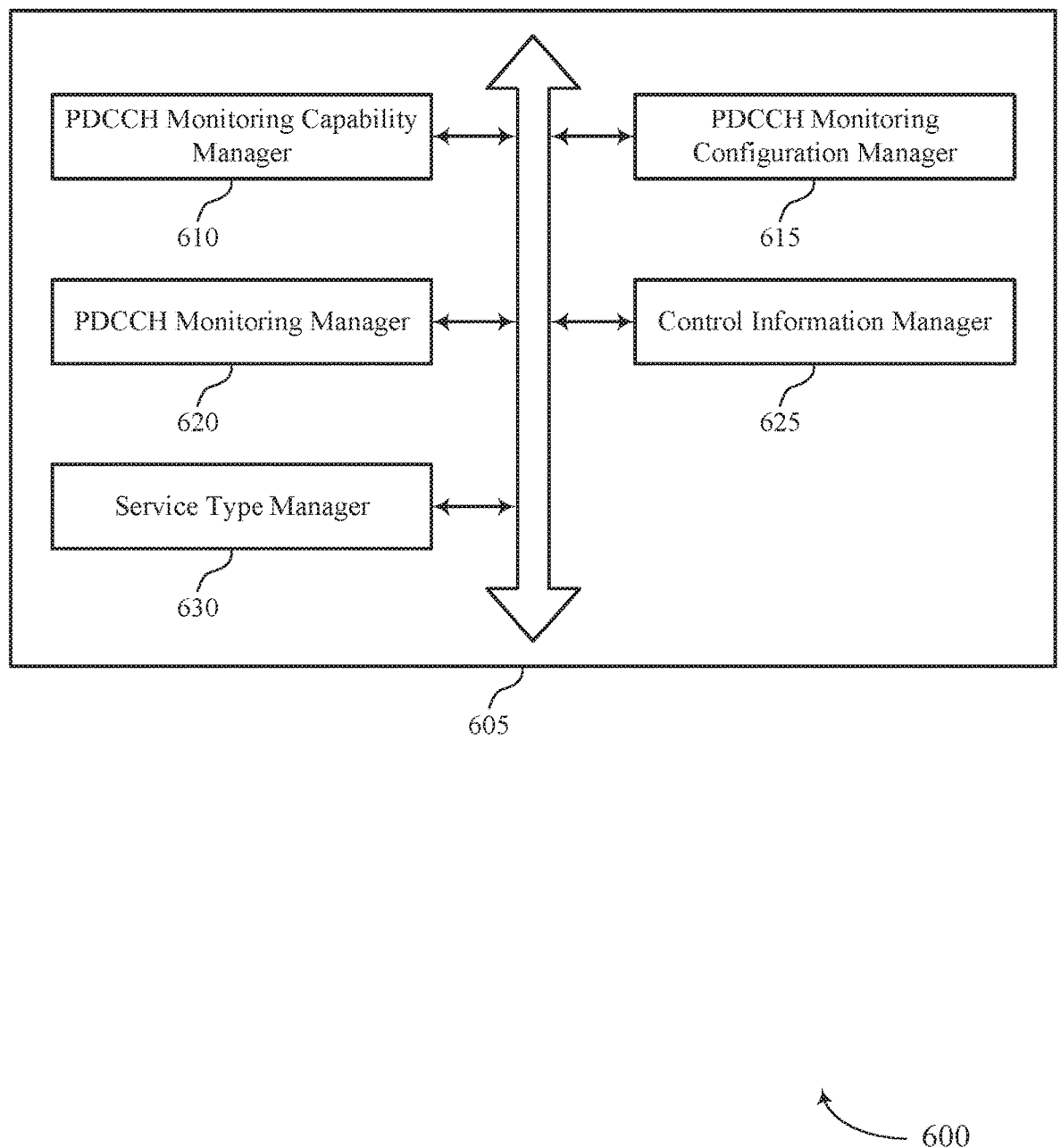
FIG. 6 shows a block diagram of an example communications manager that supports control channel monitoring capability for low latency communications.

FIG. 6 shows a block diagram of an example communications manager that supports control channel monitoring capability for low latency communications. The communications manager 605 may be an example of aspects of a communications manager 415, a communications manager 515, or a communications manager 710 described herein. The communications manager 605 may include a PDCCH monitoring capability manager 610, a PDCCH monitoring configuration manager 615, a PDCCH monitoring manager 620, a control information manager 625, and a service type manager 630. Each of these modules may communicate, directly or indirectly, with one another (such as via one or more buses).

The PDCCH monitoring capability manager 610 may transmit an indication of PDCCH monitoring capabilities to a base station.

In some examples, the PDCCH monitoring capability manager 610 may identify PDCCH monitoring capability information based on the service type, where the indication includes the PDCCH monitoring capability information.

In some examples, the PDCCH monitoring capability manager 610 may identify a first set of PDCCH monitoring capabilities and a second set of PDCCH monitoring capabilities, where the indication includes both the first set and the second set.

In some examples, the PDCCH monitoring capability manager 610 may identify one or more component carriers in a band or band combination that are supported for each of the first set of PDCCH monitoring capabilities and the second set of PDCCH monitoring capabilities, where the indication includes the one or more component carriers in the band or band combination that are supported for each of the first set and the second set.

In some examples, the PDCCH monitoring capability manager 610 may identify a number of MIMO layers, a transport block size, a number of RBs, a processing timing parameter, or some combination thereof, that are supported for each of the first set of PDCCH monitoring capabilities and the second set of PDCCH monitoring capabilities, where the indication includes the number of MIMO layers, the transport block size, the number of RBs, the processing timing parameter, or some combination thereof, that are supported for each of the first set and the second set.

In some examples, the PDCCH monitoring capability manager 610 may identify a band or band combination associated with a first PDCCH monitoring occasion.

In some examples, the PDCCH monitoring capability manager 610 may identify PDCCH monitoring capability information based on the band or band combination, where the indication includes the PDCCH monitoring capability information.

In some examples, the PDCCH monitoring capability manager 610 may identify PDCCH monitoring capability information based on a minimum time separation between the start of two spans, a maximum span length in which PDCCH is configured to be monitored with same start symbol, a carrier aggregation capability, a MIMO capability, shared channel limitations, processing power capability, or some combination thereof, where the indication includes the PDCCH monitoring capability information.

In some implementations, the PDCCH monitoring capability information includes a number of CCEs per slot, a number of CCEs per PDCCH monitoring span, a number of BDs, a number of monitorable DCI formats, or some combination thereof.

In some implementations, the first set of PDCCH monitoring capabilities and the second set of PDCCH monitoring capabilities are associated with a service type, a number of DCI formats, or some combination thereof.

In some implementations, the PDCCH monitoring capability information includes a number of CCEs supported per PDCCH monitoring occasion, a number of BDs supported per PDCCH monitoring occasion, or both.

The PDCCH monitoring configuration manager 615 may receive a configuration for one or more PDCCH monitoring occasions from the base station, where the configuration is based on the transmitted indication.

In some implementations, the received configuration includes a first configuration for a first set of PDCCH monitoring occasions based on the first set of PDCCH monitoring capabilities, a second configuration for a second set of PDCCH monitoring occasions based on the second set of PDCCH monitoring capabilities, or both.

In some implementations, the first configuration and the second configuration indicate two or more monitoring occasions or two or more monitoring spans that collide in time.

In some implementations, the configuration includes, for each of the one or more PDCCH monitoring occasions, an identification parameter associated with the base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more DC formats, an identification parameter associated with one or more service types, an identification parameter associated with one or more UE PDCCH monitoring capabilities, or any combination thereof.

The PDCCH monitoring manager 620 may monitor one or more search space sets, in accordance with the received configuration, for control information during the one or more PDCCH monitoring occasions.

In some examples, the PDCCH monitoring manager 620 may monitor for one or more DCI formats associated with each of the two or more monitoring occasions or the two or more monitoring spans that collide in time during the two or more monitoring occasions or the two or more monitoring spans.

The control information manager 625 may decode the control information within the one or more PDCCH monitoring occasions.

The service type manager 630 may identify a service type associated with a first PDCCH monitoring occasion.

Figure 7:
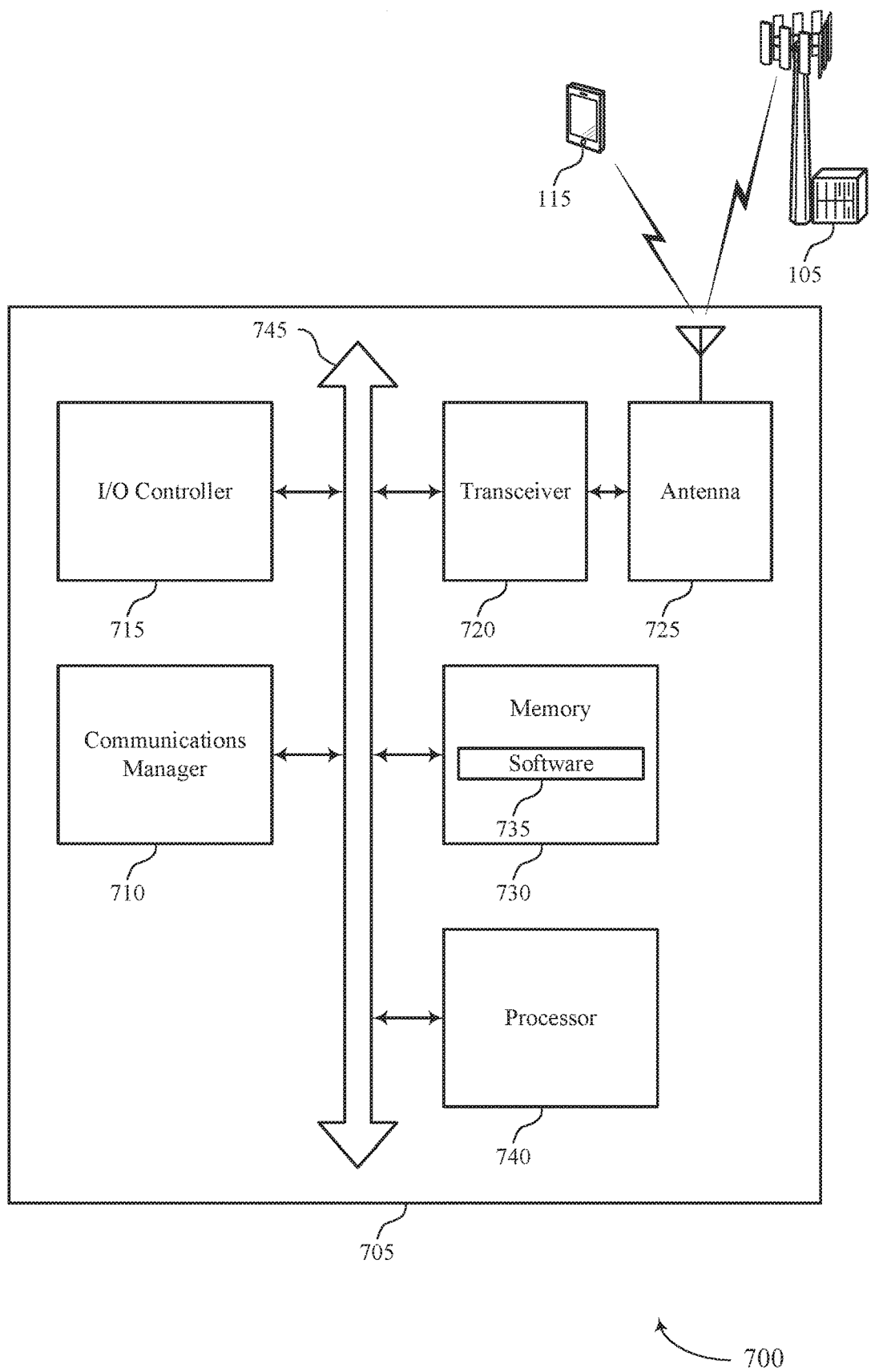
FIG. 7 shows a diagram of a system including an example device that supports control channel monitoring capability for low latency communications.

FIG. 7 shows a diagram of a system including an example device that supports control channel monitoring capability for low latency communications. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (such as bus 745).

The communications manager 710 may transmit an indication of PDCCH monitoring capabilities to a base station. The communications manager 710 may receive a configuration for one or more PDCCH monitoring occasions from the base station, where the configuration is based on the transmitted indication. The communications manager 710 may monitor one or more search space sets, in accordance with the received configuration, for control information during the one or more PDCCH monitoring occasions, and may decode the control information within the one or more PDCCH monitoring occasions.

The I/O controller 715 may manage input and output signals for the device 705. The I/O controller 715 also may manage peripherals not integrated into the device 705. In some implementations, the I/O controller 715 may represent a physical connection or port to an external peripheral. In some implementations, the I/O controller 715 may utilize an operating system such as iOS®, ANDROD®, MS-DOS®, MS-WINDOWS®, OS/2®, UNIX®, LINUX®, or another known operating system. In other implementations, the I/O controller 715 may represent or interact with a modem, a keyboard, a mouse, a touchscreen, or a similar device. In some implementations, the I/O controller 715 may be implemented as part of a processor. In some implementations, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some implementations, the wireless device may include a single antenna 725. However, in some implementations the device may have more than one antenna 725, which may be capable of concurrently transmitting or receiving multiple wireless transmissions.

The memory 730 may include RAM and ROM. In some implementations, the memory 730 may contain, among other things, a BIOS which may control basic hardware or software operation such as the interaction with peripheral components or devices.

The processor 740 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 740 may be configured to operate a memory array using a memory controller. In other implementations, a memory controller may be integrated into the processor 740.

The software 735 may include instructions to implement aspects of the present disclosure, including instructions to support wireless communications. The software 735 may be stored in a non-transitory computer-readable medium such as system memory or other type of memory.

Figure 8:
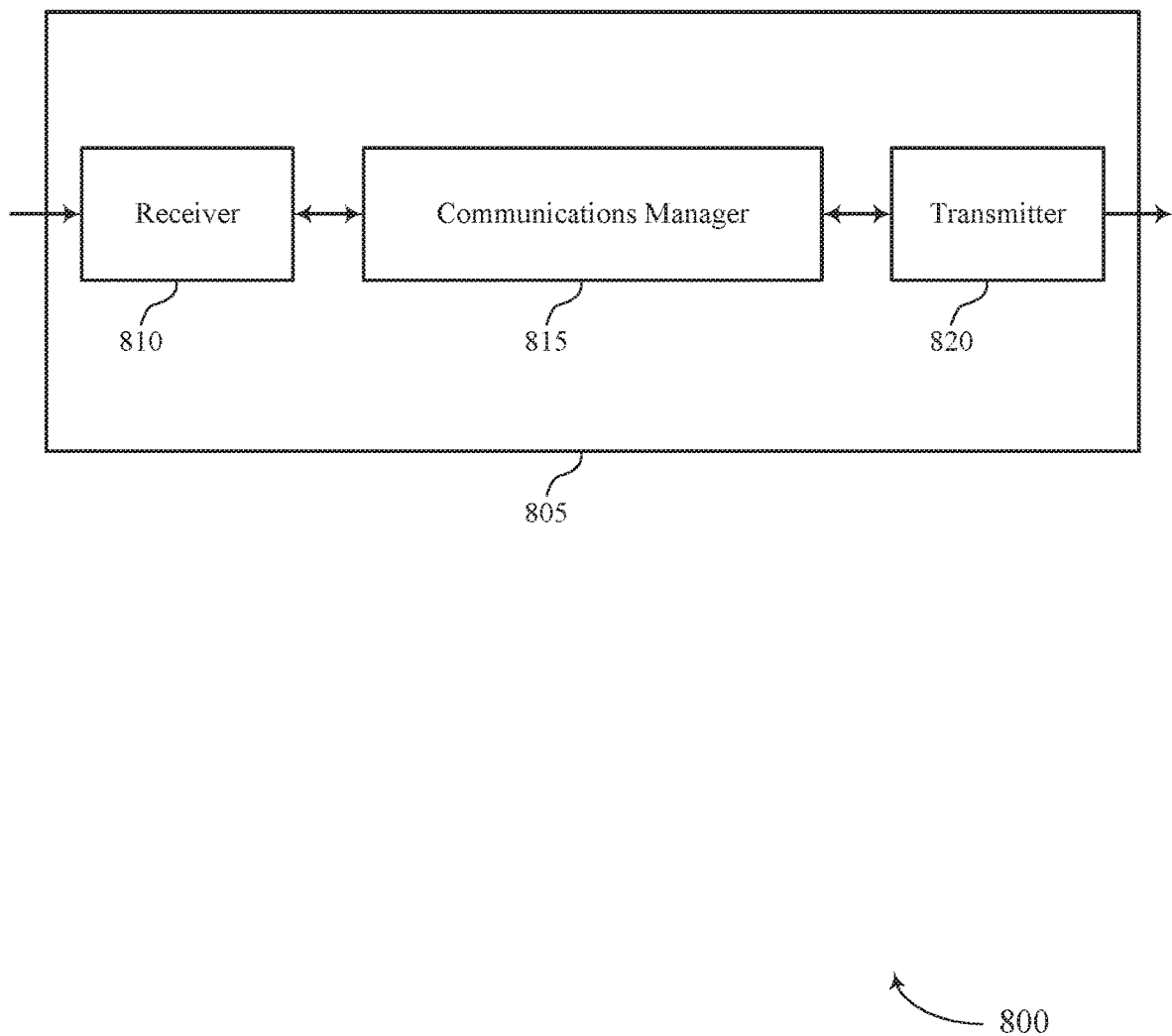
FIGS. 8 and 9 show block diagrams of example devices that support control channel monitoring capability for low latency communications.

FIG. 8 shows a block diagram of an example device that supports control channel monitoring capability for low latency communications. The device 805 may be an example of aspects of a base station 105 as described herein. The device 805 may include a receiver 810, a communications manager 815, and a transmitter 820. The device 805 also may include a processor. Each of these components may be in communication with one another (such as via one or more buses).

The receiver 810 may receive information such as packets, user data, or control information associated with various information channels (such as control channels, data channels, and information related to control channel monitoring capability for low latency communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive an indication of UE PDCCH monitoring capabilities from a UE. The communications manager 815 may determine a configuration for one or more PDCCH monitoring occasions, where the configuration is based on the received indication, and may transmit the configuration to the UE. The communications manager 815 may transmit, in accordance with the transmitted configuration, control information during the one or more PDCCH monitoring occasions. The communications manager 815 may be an example of aspects of the communications manager 1110 described herein.

The communications manager 815, or its sub-components, may be implemented in hardware, code (such as software or firmware) executed by a processor, or any combination thereof. If implemented in code executed by a processor, the functions of the communications manager 815 or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
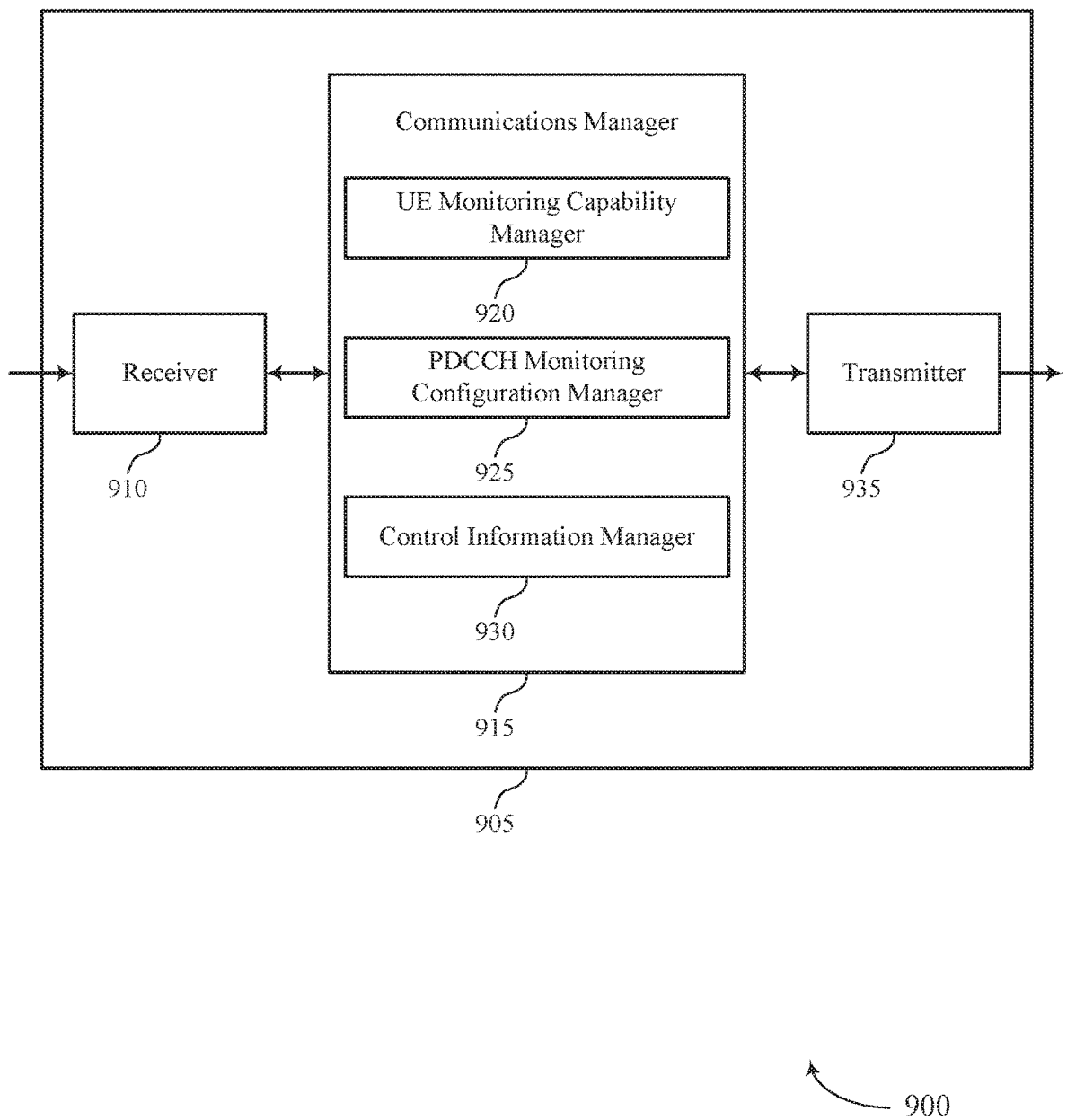

FIG. 9 shows a block diagram of an example device that supports control channel monitoring capability for low latency communications. The device 905 may be an example of aspects of a device 805 or a base station 105 as described herein. The device 905 may include a receiver 910, a communications manager 915, and a transmitter 935. The device 905 also may include a processor. Each of these components may be in communication with one another (such as via one or more buses).

The receiver 910 may receive information such as packets, user data, or control information associated with various information channels (such as control channels, data channels, and information related to control channel monitoring capability for low latency communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 or the communications manager 1110 as described herein. The communications manager 915 may include a UE monitoring capability manager 920, a PDCCH monitoring configuration manager 925, and a control information manager 930.

The UE monitoring capability manager 920 may receive an indication of UE PDCCH monitoring capabilities from a UE.

The PDCCH monitoring configuration manager 925 may determine a configuration for one or more PDCCH monitoring occasions, where the configuration is based on the received indication and transmit the configuration to the UE.

The control information manager 930 may transmit, in accordance with the transmitted configuration, control information during the one or more PDCCH monitoring occasions.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
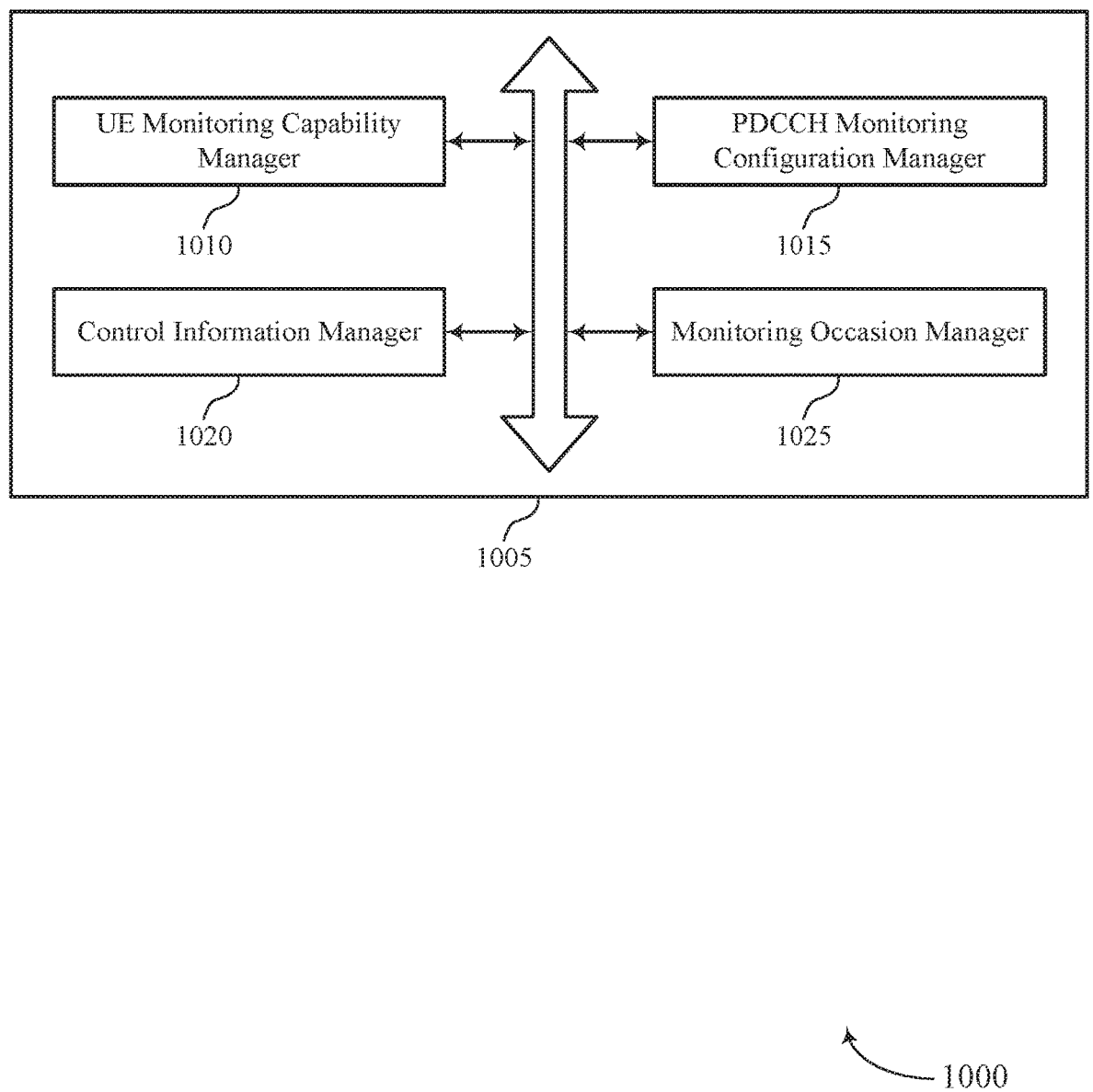
FIG. 10 shows a block diagram of an example communications manager that supports control channel monitoring capability for low latency communications.

FIG. 10 shows a block diagram of an example communications manager that supports control channel monitoring capability for low latency communications. The communications manager 1005 may be an example of aspects of a communications manager 815, a communications manager 915, or a communications manager 1110 described herein. The communications manager 1005 may include a UE monitoring capability manager 1010, a PDCCH monitoring configuration manager 1015, a control information manager 1020, and a monitoring occasion manager 1025. Each of these modules may communicate, directly or indirectly, with one another (such as via one or more buses).

The UE monitoring capability manager 1010 may receive an indication of UE PDCCH monitoring capabilities from a UE.

In some examples, the UE monitoring capability manager 1010 may identify UE PDCCH monitoring capability information based on the received indication, where the configuration for one or more PDCCH monitoring occasions is determined based on the UE PDCCH monitoring capability information.

In some examples, the UE monitoring capability manager 1010 may identify a number of MIMO layers, a transport block size, a number of RBs, a processing timing parameter, or some combination thereof, that are supported by the UE for each of the first set of PDCCH monitoring capabilities and the second set of PDCCH monitoring capabilities based on the received indication.

In some implementations, the UE PDCCH monitoring capability information includes a number of CCEs per slot, a number of CCEs per PDCCH monitoring span, a number of CCEs supported per PDCCH monitoring occasion, a number of BDs supported per PDCCH monitoring occasion, a number of monitorable DCI formats, or some combination thereof.

In some implementations, the UE PDCCH monitoring capability information includes a minimum time separation between the start of two spans, a maximum span length in which PDCCH is configured to be monitored with same start symbol, a carrier aggregation capability, a MIMO capability, shared channel limitations, processing power capability, or some combination thereof.

In some implementations, the first set of UE PDCCH monitoring capabilities and the second set of UE PDCCH monitoring capabilities are each associated with one or more component carriers in a band or band combination.

The PDCCH monitoring configuration manager 1015 may determine a configuration for one or more PDCCH monitoring occasions, where the configuration is based on the received indication.

In some examples, the PDCCH monitoring configuration manager 1015 may transmit the configuration to the UE.

In some examples, the PDCCH monitoring configuration manager 1015 may identify a first set of UE PDCCH monitoring capabilities and a second set of UE PDCCH monitoring capabilities based on the received indication.

In some examples, the PDCCH monitoring configuration manager 1015 may determine a first configuration for a first set of one or more PDCCH monitoring occasions based on the first set of UE PDCCH monitoring capabilities.

In some examples, the PDCCH monitoring configuration manager 1015 may determine a second configuration for a second set of one or more PDCCH monitoring occasions based on the second set of UE PDCCH monitoring capabilities, where the configuration transmitted to the UE includes the first configuration and the second configuration.

In some implementations, the first set of UE PDCCH monitoring capabilities and the second set of UE PDCCH monitoring capabilities are each associated with a service type, a number of DC formats, or some combination thereof.

The control information manager 1020 may transmit, in accordance with the transmitted configuration, control information during the one or more PDCCH monitoring occasions.

The monitoring occasion manager 1025 may identify two or more monitoring occasions or two or more monitoring spans that collide in time, where the configuration is determined based on the first set of UE PDCCH monitoring capabilities, the second set of UE PDCCH monitoring capabilities, and the identification that two or more monitoring occasions or two or more monitoring spans that collide in time.

In some examples, the monitoring occasion manager 1025 may determine, for each of the one or more PDCCH monitoring occasions, an identification parameter associated with the base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more DCI formats, an identification parameter associated with one or more service types, an identification parameter associated with one or more UE PDCCH monitoring capabilities, or any combination thereof.

Figure 11:
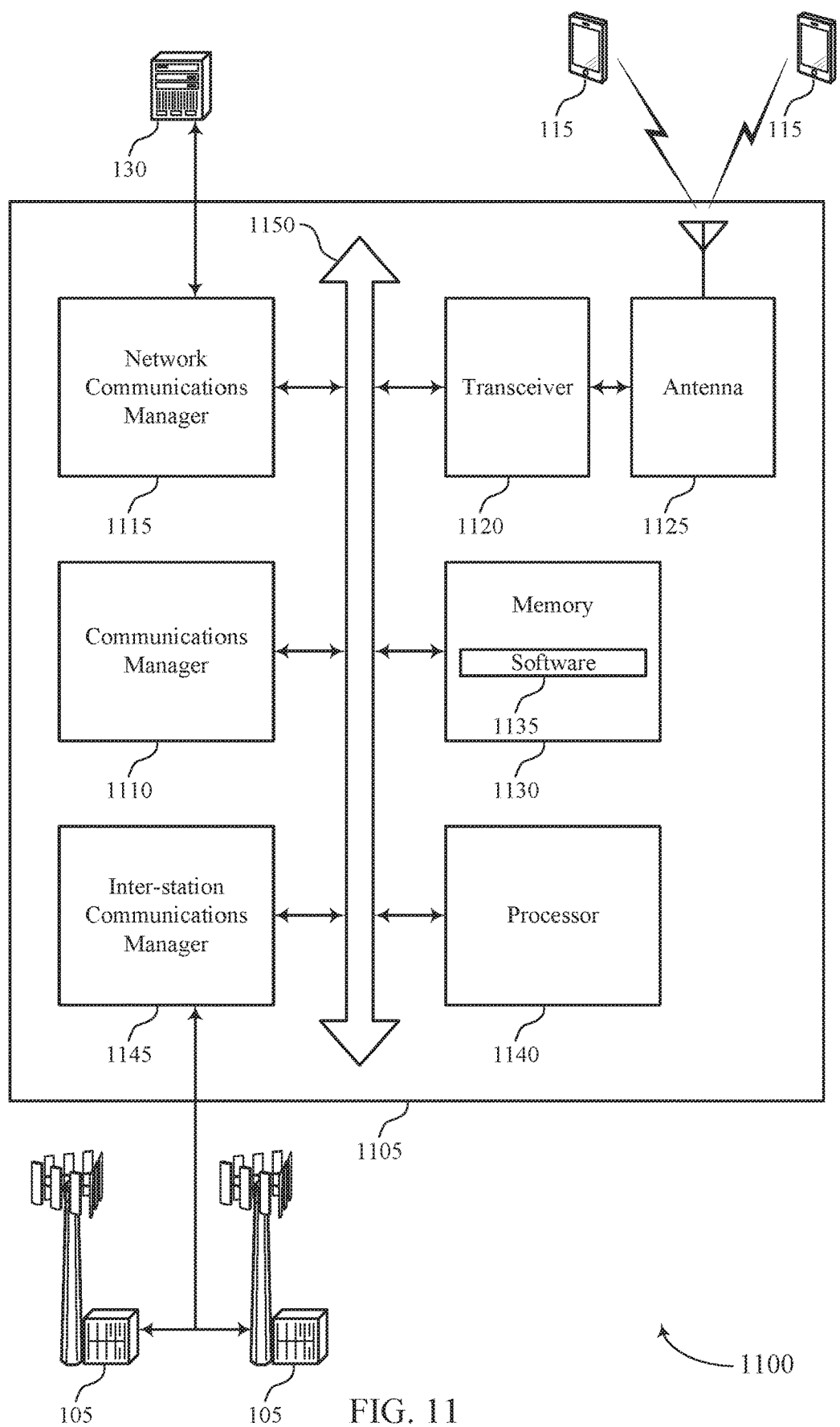
FIG. 11 shows a diagram of a system including an example device that supports control channel monitoring capability for low latency communications.

FIG. 11 shows a diagram of a system including an example device that supports control channel monitoring capability for low latency communications. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (such as bus 1150).

The communications manager 1110 may receive an indication of UE PDCCH monitoring capabilities from a UE. The communications manager 1110 may determine a configuration for one or more PDCCH monitoring occasions, where the configuration is based on the received indication, and may transmit the configuration to the UE. The communications manager 1110 may transmit, in accordance with the transmitted configuration, control information during the one or more PDCCH monitoring occasions.

The network communications manager 1115 may manage communications with the core network (such as via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 also may include a modem to modulate the packets and provide the modulated packets to the antennas for transmission, and to demodulate packets received from the antennas.

In some implementations, the wireless device may include a single antenna 1125. However, in some implementations the device may have more than one antenna 1125, which may be capable of concurrently transmitting or receiving multiple wireless transmissions.

The memory 1130 may include RAM, ROM, or a combination thereof. In some implementations, the memory 1130 may contain, among other things, a BIOS which may control basic hardware or software operation such as the interaction with peripheral components or devices.

The processor 1140 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 1140 may be configured to operate a memory array using a memory controller. In some implementations, a memory controller may be integrated into processor 1140.

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The software 1135 may include instructions to implement aspects of the present disclosure, including instructions to support wireless communications. The software 1135 may be stored in a non-transitory computer-readable medium such as system memory or other type of memory.

Figure 12:
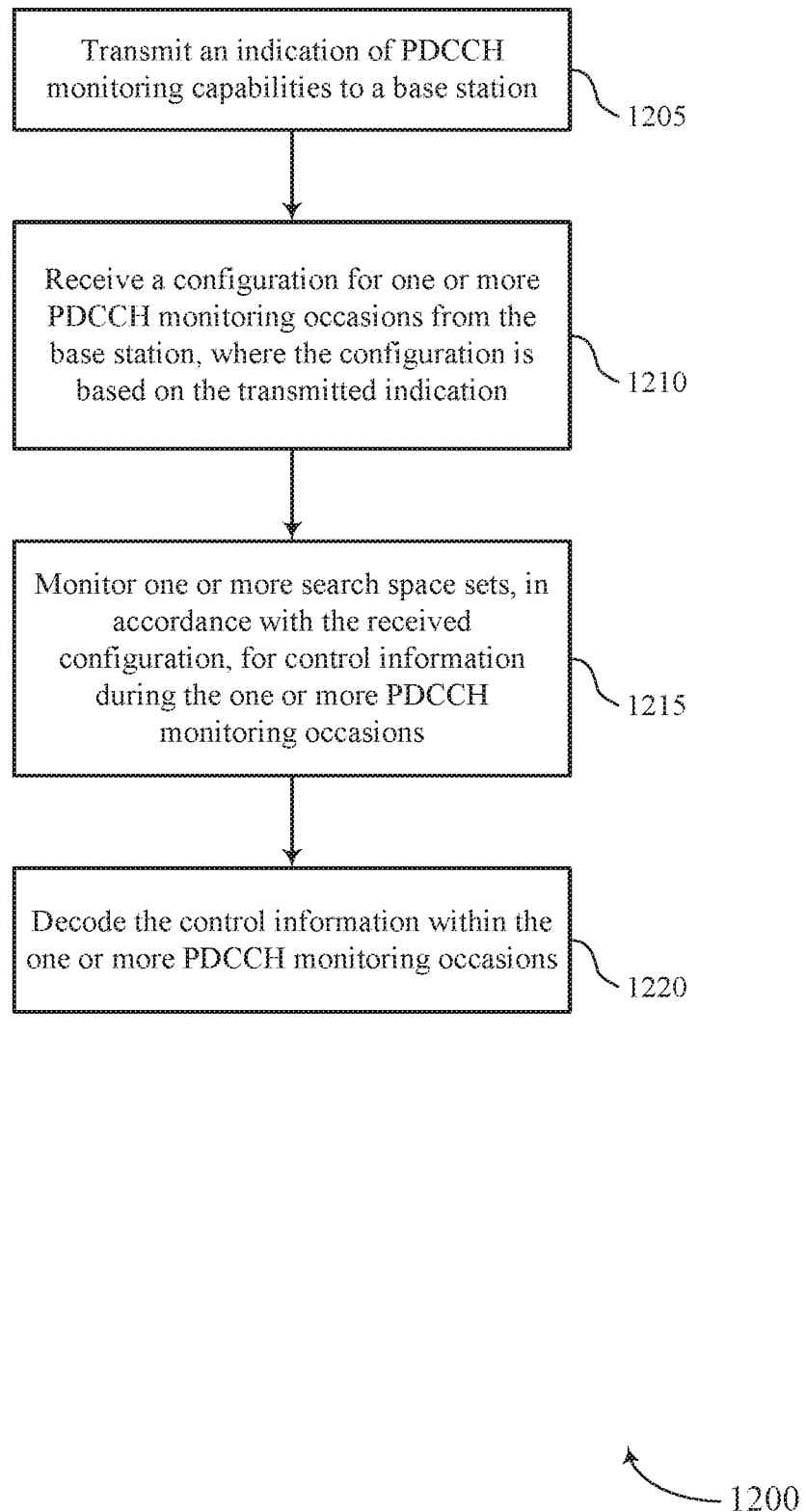
FIGS. 12-16 show flowcharts illustrating example methods that support control channel monitoring capability for low latency communications.

FIG. 12 shows a flowchart illustrating a method that supports control channel monitoring capability for low latency communications. The operations of method 1200 may be implemented by a UE 115 or its components as described herein. For example, the operations of method 1200 may be performed by a communications manager as described with reference to FIGS. 4-7. In some examples, a UE may execute a set of instructions to control the functional elements of the UE to perform the functions described below. Additionally, or alternatively, a UE may perform aspects of the functions described below using special-purpose hardware.

At 1205, the UE may transmit an indication of PDCCH monitoring capabilities to a base station. The operations of 1205 may be performed according to the methods described herein. In some examples, aspects of the operations of 1205 may be performed by a PDCCH monitoring capability manager as described with reference to FIGS. 4-7.

At 1210, the UE may receive a configuration for one or more PDCCH monitoring occasions from the base station, where the configuration is based on the transmitted indication. The operations of 1210 may be performed according to the methods described herein. In some examples, aspects of the operations of 1210 may be performed by a PDCCH monitoring configuration manager as described with reference to FIGS. 4-7.

At 1215, the UE may monitor one or more search space sets, in accordance with the received configuration, for control information during the one or more PDCCH monitoring occasions. The operations of 1215 may be performed according to the methods described herein. In some examples, aspects of the operations of 1215 may be performed by a PDCCH monitoring manager as described with reference to FIGS. 4-7.

At 1220, the UE may decode the control information within the one or more PDCCH monitoring occasions. The operations of 1220 may be performed according to the methods described herein. In some examples, aspects of the operations of 1220 may be performed by a control information manager as described with reference to FIGS. 4-7.

Figure 13:
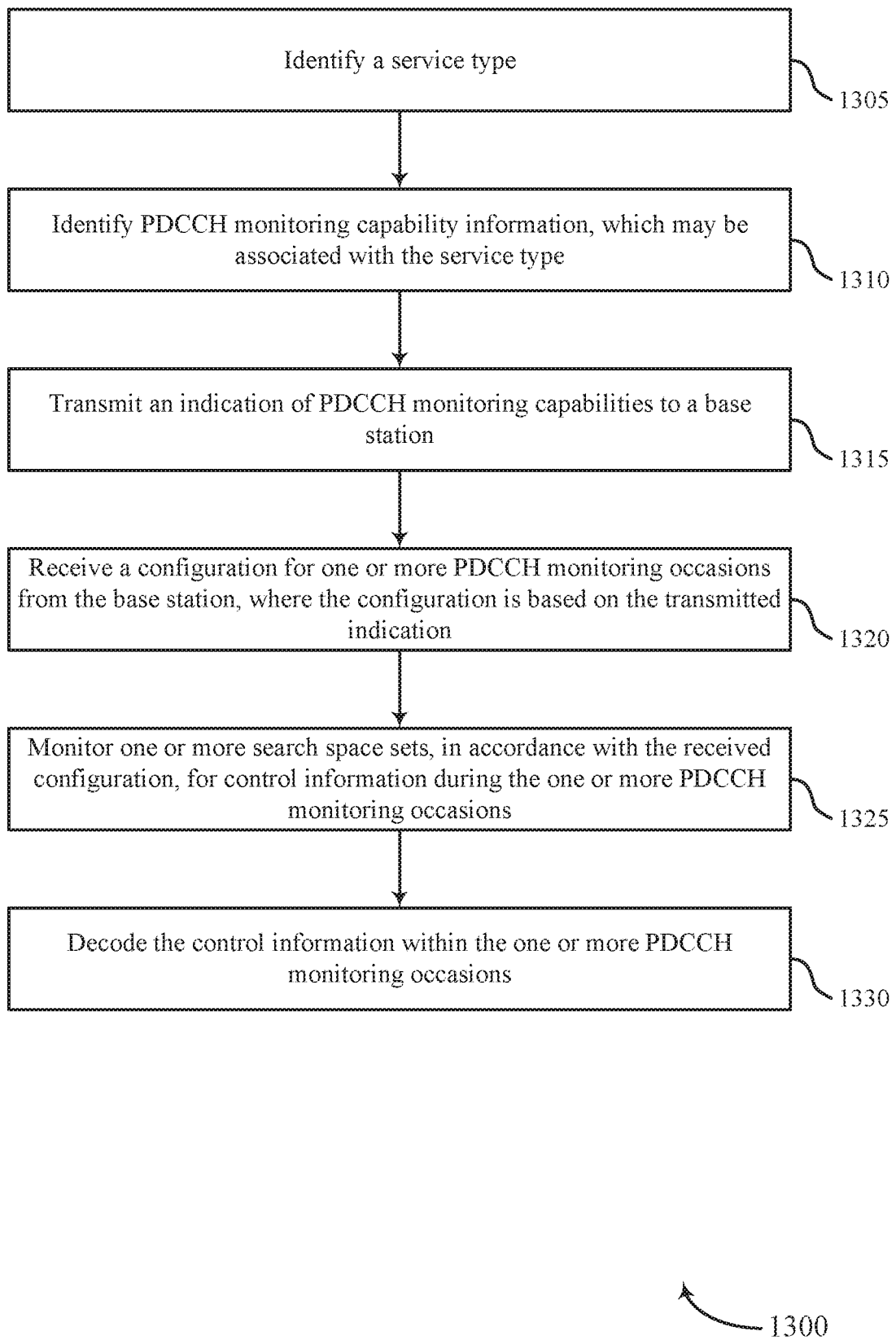

FIG. 13 shows a flowchart illustrating a method that supports control channel monitoring capability for low latency communications. The operations of method 1300 may be implemented by a UE 115 or its components as described herein. For example, the operations of method 1300 may be performed by a communications manager as described with reference to FIGS. 4-7. In some examples, a UE may execute a set of instructions to control the functional elements of the UE to perform the functions described below. Additionally, or alternatively, a UE may perform aspects of the functions described below using special-purpose hardware.

At 1305, the UE may identify a service type, for example, via PHY layer indication such as DCI format, TC state, RNTI, CORESET ID, a bit in the DCI, etc. The operations of 1305 may be performed according to the methods described herein. In some examples, aspects of the operations of 1305 may be performed by a service type manager as described with reference to FIGS. 4-7.

At 1310, the UE may identify PDCCH monitoring capability information, which may be associated with the service type. For example, the UE may identify PDCCH monitoring capability information for a monitoring occasion, which may be represent PDCCH monitoring capabilities for the identified service type. The operations of 1310 may be performed according to the methods described herein. In some examples, aspects of the operations of 1310 may be performed by a PDCCH monitoring capability manager as described with reference to FIGS. 4-7.

At 1315, the UE may transmit an indication of PDCCH monitoring capabilities to a base station. For example, the indication of PDCCH monitoring capabilities may indicate the identified PDCCH monitoring capability information associated with the identified service type. The indication may include information about the capability of the UE to support different PDCCH capabilities and a number of carriers associated with the PDCCH capabilities. The operations of 1315 may be performed according to the methods described herein. In some examples, aspects of the operations of 1315 may be performed by a PDCCH monitoring capability manager as described with reference to FIGS. 4-7.

At 1320, the UE may receive a configuration for one or more PDCCH monitoring occasions from the base station, where the configuration is based on the transmitted indication. The operations of 1320 may be performed according to the methods described herein. In some examples, aspects of the operations of 1320 may be performed by a PDCCH monitoring configuration manager as described with reference to FIGS. 4-7.

At 1325, the UE may monitor one or more search space sets, in accordance with the received configuration, for control information during the one or more PDCCH monitoring occasions. The operations of 1325 may be performed according to the methods described herein. In some examples, aspects of the operations of 1325 may be performed by a PDCCH monitoring manager as described with reference to FIGS. 4-7.

At 1330, the UE may decode the control information within the one or more PDCCH monitoring occasions. The operations of 1330 may be performed according to the methods described herein. In some examples, aspects of the operations of 1330 may be performed by a control information manager as described with reference to FIGS. 4-7.

Figure 14:
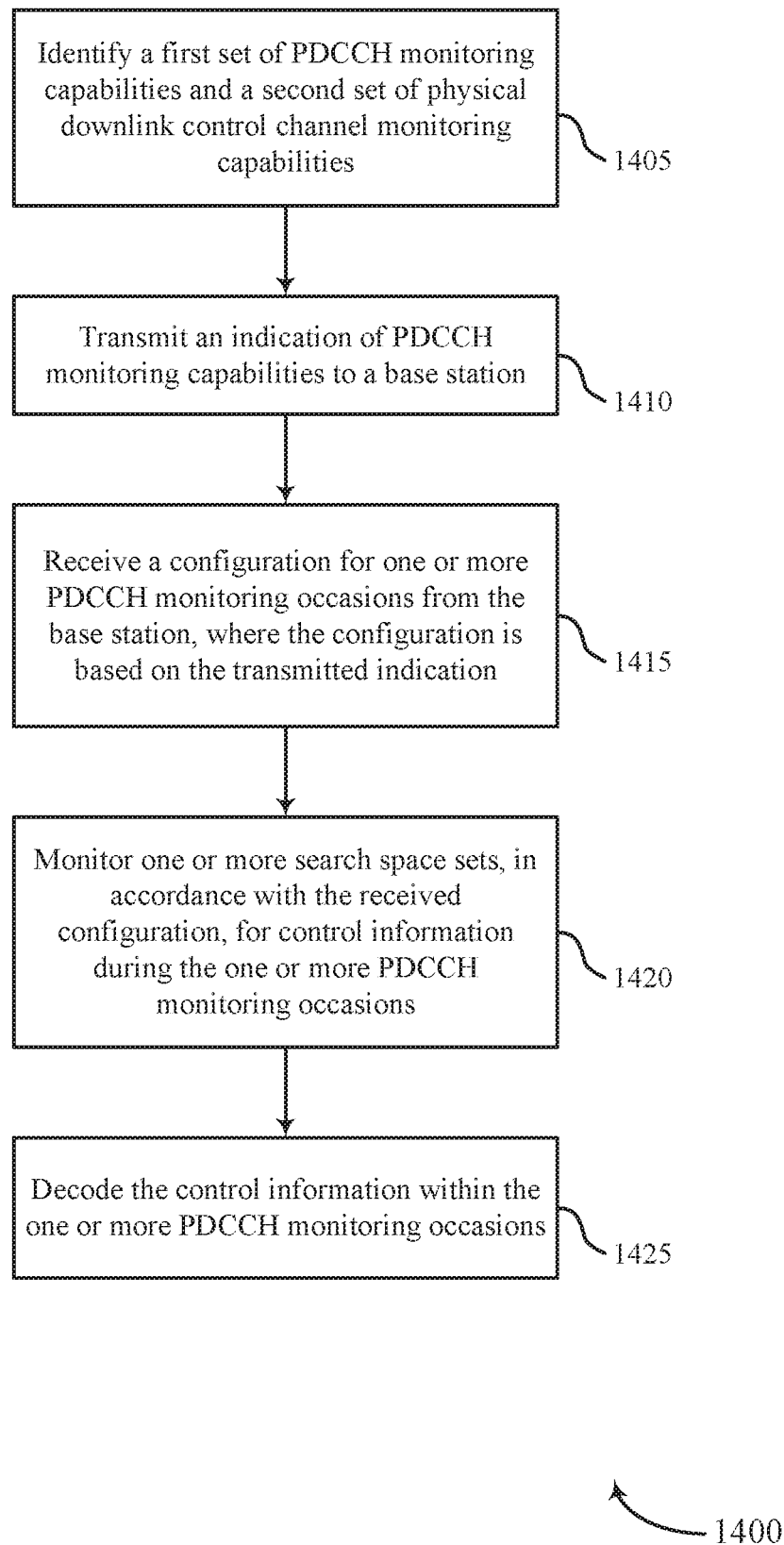

FIG. 14 shows a flowchart illustrating a method that supports control channel monitoring capability for low latency communications. The operations of method 1400 may be implemented by a UE 115 or its components as described herein. For example, the operations of method 1400 may be performed by a communications manager as described with reference to FIGS. 4-7. In some examples, a UE may execute a set of instructions to control the functional elements of the UE to perform the functions described below. Additionally, or alternatively, a UE may perform aspects of the functions described below using special-purpose hardware.

At 1405, the UE may identify a first set of PDCCH monitoring capabilities and a second set of PDCCH monitoring capabilities. For example, the UE may identify different PDCCH monitoring capabilities in terms of the number of CCEs/BDs, number of DCIs per monitoring span or slot, etc. In some implementations, each of the first and second sets of PDCCH monitoring capabilities may be identified or determined based on a service type (associated with each set of PDCCH monitoring capabilities), a number of DCI formats (associated with a service type corresponding to each set of PDCCH monitoring capabilities), etc. The operations of 1405 may be performed according to the methods described herein. In some examples, aspects of the operations of 1405 may be performed by a PDCCH monitoring capability manager as described with reference to FIGS. 4-7.

At 1410, the UE may transmit an indication of PDCCH monitoring capabilities to a base station. For example, the indication of PDCCH monitoring capabilities may indicate the first set of PDCCH monitoring capabilities and the second set of PDCCH monitoring capabilities. The operations of 1410 may be performed according to the methods described herein. In some examples, aspects of the operations of 1410 may be performed by a PDCCH monitoring capability manager as described with reference to FIGS. 4-7.

At 1415, the UE may receive a configuration for one or more PDCCH monitoring occasions from the base station, where the configuration is based on the transmitted indication. In some implementations, the received configuration may include a first configuration for a first set of PDCCH monitoring occasions based on the first set of PDCCH monitoring capabilities, a second configuration for a second set of PDCCH monitoring occasions based on the second set of PDCCH monitoring capabilities, or both. The operations of 1415 may be performed according to the methods described herein. In some examples, aspects of the operations of 1415 may be performed by a PDCCH monitoring configuration manager as described with reference to FIGS. 4-7.

At 1420, the UE may monitor one or more search space sets, in accordance with the received configuration, for control information during the one or more PDCCH monitoring occasions. For example, in some implementations, the UE may monitor the first set of PDCCH monitoring occasions according to the first configuration and monitor the second set of PDCCH monitoring occasions according to the second configuration. In some implementations, the UE may monitor the first and second sets of PDCCH monitoring occasions according to one configuration. In some implementations, the UE may monitor the first set of PDCCH monitoring occasions according to the first configuration and may monitor the second set of PDCCH monitoring occasions according to some default configuration, etc. The operations of 1420 may be performed according to the methods described herein. In some examples, aspects of the operations of 1420 may be performed by a PDCCH monitoring manager as described with reference to FIGS. 4-7.

At 1425, the UE may decode the control information within the one or more PDCCH monitoring occasions. The operations of 1425 may be performed according to the methods described herein. In some examples, aspects of the operations of 1425 may be performed by a control information manager as described with reference to FIGS. 4-7.

Figure 15:
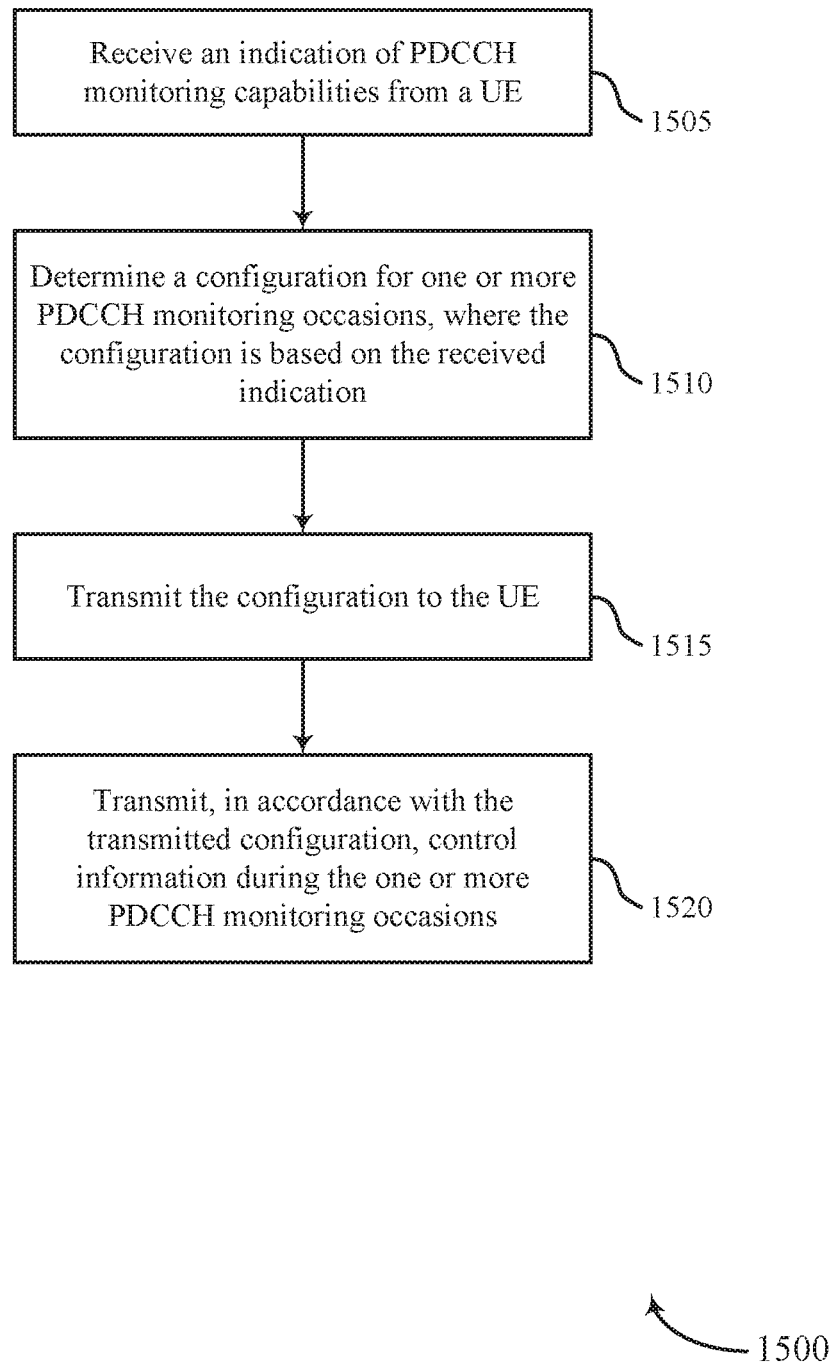

FIG. 15 shows a flowchart illustrating a method that supports control channel monitoring capability for low latency communications. The operations of method 1500 may be implemented by a base station 105 or its components as described herein. For example, the operations of method 1500 may be performed by a communications manager as described with reference to FIGS. 8-11. In some examples, a base station may execute a set of instructions to control the functional elements of the base station to perform the functions described below. Additionally, or alternatively, a base station may perform aspects of the functions described below using special-purpose hardware.

At 1505, the base station may receive an indication of UE PDCCH monitoring capabilities from a UE. The operations of 1505 may be performed according to the methods described herein. In some examples, aspects of the operations of 1505 may be performed by a UE monitoring capability manager as described with reference to FIGS. 8-11.

At 1510, the base station may determine a configuration for one or more PDCCH monitoring occasions, where the configuration is based on the received indication. The operations of 1510 may be performed according to the methods described herein. In some examples, aspects of the operations of 1510 may be performed by a PDCCH monitoring configuration manager as described with reference to FIGS. 8-11.

At 1515, the base station may transmit the configuration to the UE. The operations of 1515 may be performed according to the methods described herein. In some examples, aspects of the operations of 1515 may be performed by a PDCCH monitoring configuration manager as described with reference to FIGS. 8-11.

At 1520, the base station may transmit, in accordance with the transmitted configuration, control information during the one or more PDCCH monitoring occasions. The operations of 1520 may be performed according to the methods described herein. In some examples, aspects of the operations of 1520 may be performed by a control information manager as described with reference to FIGS. 8-11.

Figure 16:
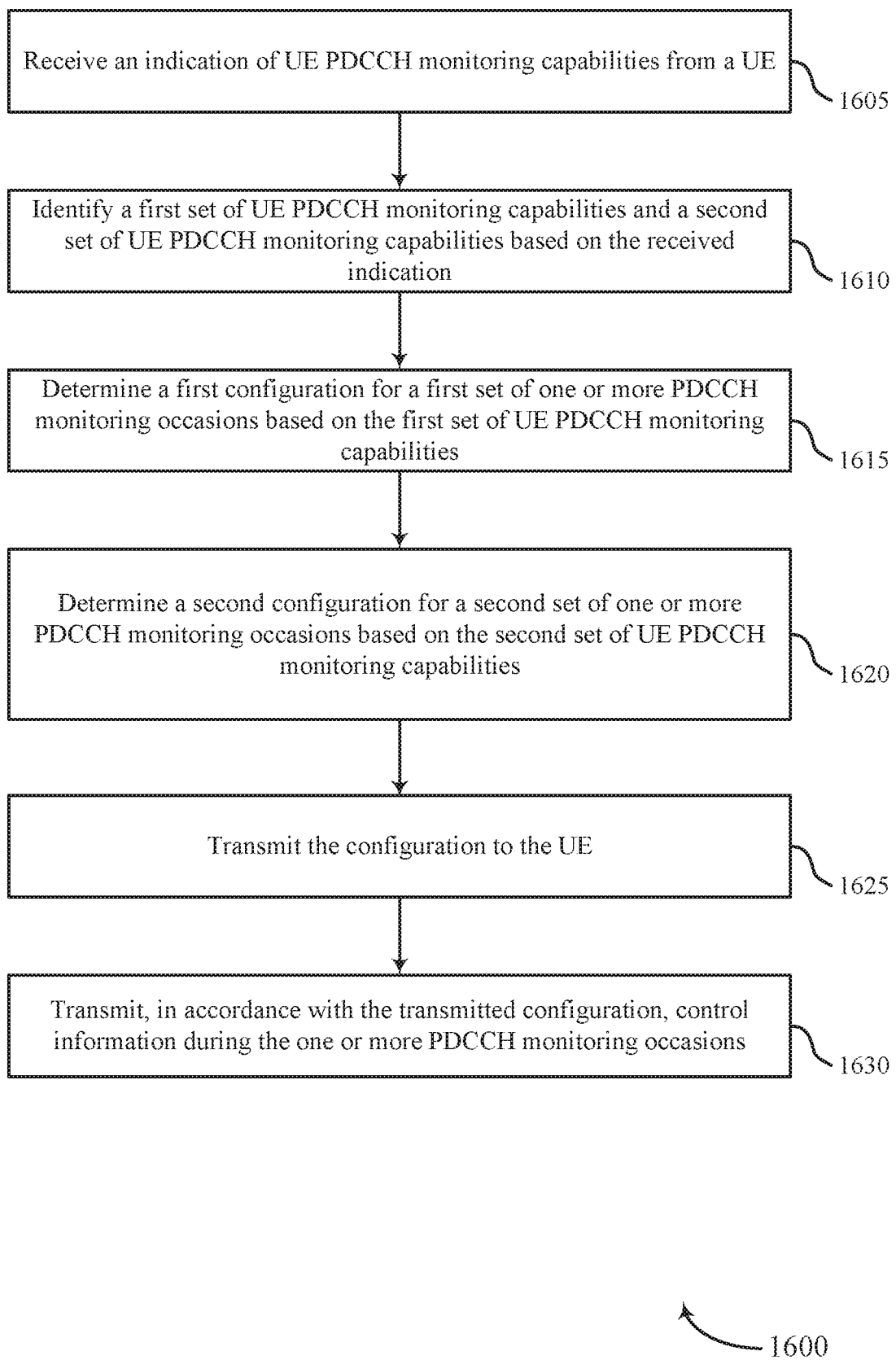

FIG. 16 shows a flowchart illustrating a method that supports control channel monitoring capability for low latency communications. The operations of method 1600 may be implemented by a base station 105 or its components as described herein. For example, the operations of method 1600 may be performed by a communications manager as described with reference to FIGS. 8-11. In some examples, a base station may execute a set of instructions to control the functional elements of the base station to perform the functions described below. Additionally, or alternatively, a base station may perform aspects of the functions described below using special-purpose hardware.

At 1605, the base station may receive an indication of UE PDCCH monitoring capabilities from a UE. The operations of 1605 may be performed according to the methods described herein. In some examples, aspects of the operations of 1605 may be performed by a UE monitoring capability manager as described with reference to FIGS. 8-11.

At 1610, the base station may identify a first set of UE PDCCH monitoring capabilities and a second set of UE PDCCH monitoring capabilities based on the received indication. The operations of 1610 may be performed according to the methods described herein. In some examples, aspects of the operations of 1610 may be performed by a PDCCH monitoring configuration manager as described with reference to FIGS. 8-11.

At 1615, the base station may determine a first configuration for a first set of one or more PDCCH monitoring occasions based on the first set of UE PDCCH monitoring capabilities. The operations of 1615 may be performed according to the methods described herein. In some examples, aspects of the operations of 1615 may be performed by a PDCCH monitoring configuration manager as described with reference to FIGS. 8-11.

At 1620, the base station may determine a second configuration for a second set of one or more PDCCH monitoring occasions based on the second set of UE PDCCH monitoring capabilities, where the configuration transmitted to the UE includes the first configuration and the second configuration. The operations of 1620 may be performed according to the methods described herein. In some examples, aspects of the operations of 1620 may be performed by a PDCCH monitoring configuration manager as described with reference to FIGS. 8-11.

At 1625, the base station may transmit the configuration to the UE. For example, in some implementations the configuration may include the determined first configuration for the first set of one or more PDCCH monitoring occasions, the determined second configuration for the second set of one or more PDCCH monitoring occasions, or both. The operations of 1625 may be performed according to the methods described herein. In some examples, aspects of the operations of 1625 may be performed by a PDCCH monitoring configuration manager as described with reference to FIGS. 8-11.

At 1630, the base station may transmit, in accordance with the transmitted configuration, control information during the one or more PDCCH monitoring occasions. The operations of 1630 may be performed according to the methods described herein. In some examples, aspects of the operations of 1630 may be performed by a control information manager as described with reference to FIGS. 8-11.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, as a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro. NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (such as several kilometers in radius) and may allow unrestricted access by UEs with service subscriptions with the network provider. A small cell may be associated with a lower-powered base station, as compared with a macro cell, and a small cell may operate in the same or different (such as licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell also may cover a small geographic area (such as a home) and may provide restricted access by UEs having an association with the femto cell (such as UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (such as two, three, four, and the like) cells, and also may support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor also may be implemented as a combination of computing devices (such as a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions also may be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
 a processor;
 memory coupled with the processor; and
 instructions stored in the memory and executable by the processor to cause the apparatus to:
  identify, based at least in part on a carrier aggregation capability of the UE, a first set of physical downlink control channel (PDCCH) monitoring capabilities indicating UE capabilities for PDCCH monitoring per span and a second set of PDCCH monitoring capabilities indicating UE capabilities for PDCCH monitoring per slot;
  transmit an indication of PDCCH monitoring capabilities for transmission, wherein the indication includes both the first set of PDCCH monitoring capabilities indicating UE capabilities for PDCCH monitoring per span and the second set of PDCCH monitoring capabilities indicating UE capabilities for PDCCH monitoring per slot, the first set of PDCCH monitoring capabilities corresponding to a first number of control channel elements (CCEs) or blind decodes (BDs) per span, the second set of PDCCH monitoring capabilities corresponding to a second number of CCEs or BDs per slot;
receive a configuration for one or more PDCCH monitoring occasions, wherein the configuration is based at least in part on the indication;
monitor one or more search space sets, in accordance with the received configuration, for control information during the one or more PDCCH monitoring occasions; and
decode the control information within the one or more PDCCH monitoring occasions.

2. The apparatus of claim 1, wherein the PDCCH monitoring capability indication includes a span pattern, a number of BDs, a number of downlink control information formats configurable for monitoring, or some combination thereof.

3. The apparatus of claim 1, wherein the first set of PDCCH monitoring capabilities indicating UE capabilities for PDCCH monitoring per span and the second set of PDCCH monitoring capabilities indicating UE capabilities for PDCCH monitoring per slot are associated with a service type, a number of downlink control information formats, or some combination thereof.

4. The apparatus of claim 1, wherein the instructions are further executable by the processor to cause the apparatus to:
identify one or more component carriers in a band or band combination that are supported for each of the first set of PDCCH monitoring capabilities indicating UE capabilities for PDCCH monitoring per span and the second set of PDCCH monitoring capabilities indicating UE capabilities for PDCCH monitoring per slot, wherein the indication includes the one or more component carriers in the band or band combination that are supported for each of the first set and the second set.

5. The apparatus of claim 1, wherein the configuration includes a first configuration for a first set of PDCCH monitoring occasions based at least in part on the first set of PDCCH monitoring capabilities indicating UE capabilities for PDCCH monitoring per span, a second configuration for a second set of PDCCH monitoring occasions based at least in part on the second set of PDCCH monitoring capabilities indicating UE capabilities for PDCCH monitoring per slot, or both.

6. The apparatus of claim 5, wherein the first configuration and the second configuration indicate two or more monitoring occasions or two or more monitoring spans that collide in time.

7. The apparatus of claim 6, wherein the instructions are further executable by the processor to cause the apparatus to:
monitor for one or more downlink control information formats associated with each of the two or more monitoring occasions or the two or more monitoring spans that collide in time during the two or more monitoring occasions or the two or more monitoring spans.

8. The apparatus of claim 1, wherein the instructions are further executable by the processor to cause the apparatus to:
identify a number of multiple input multiple output layers, a transport block size, a number of resource blocks, a processing timing parameter, or some combination thereof, that are supported for each of the first set of PDCCH monitoring capabilities indicating UE capabilities for PDCCH monitoring per span and the second set of PDCCH monitoring capabilities indicating UE capabilities for PDCCH monitoring per slot, wherein the indication includes the number of multiple input multiple output layers, the transport block size, the number of resource blocks, the processing timing parameter, or some combination thereof, that are supported for each of the first set and the second set.

9. The apparatus of claim 1, wherein the instructions are further executable by the processor to cause the apparatus to:
identify a band or band combination associated with a PDCCH monitoring occasion; and
identify PDCCH monitoring capability information based at least in part on the band or band combination, wherein the indication includes the PDCCH monitoring capability information.

10. The apparatus of claim 1, wherein the instructions are further executable by the processor to cause the apparatus to:
identify PDCCH monitoring capability information based at least in part on a minimum time separation between the start of two spans, a maximum span length in which PDCCH is configured to be monitored with same start symbol, a multiple input multiple output capability, shared channel limitations, processing power capability, or some combination thereof, wherein the indication includes the PDCCH monitoring capability information.

11. The apparatus of claim 10, wherein the PDCCH monitoring capability information includes a number of CCEs supported per PDCCH monitoring occasion, a number of BDs supported per PDCCH monitoring occasion, or both.

12. The apparatus of claim 1, wherein the configuration includes, for each of the one or more PDCCH monitoring occasions, an identification parameter associated with a base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more downlink control information formats, an identification parameter associated with one or more service types, an identification parameter associated with one or more UE PDCCH monitoring capabilities, or any combination thereof.

13. A method for wireless communications at an apparatus of a user equipment (UE), comprising:
identifying, based at least in part on a carrier aggregation capability of the UE, a first set of physical downlink control channel (PDCCH) monitoring capabilities indicating UE capabilities for PDCCH monitoring per span and a second set of PDCCH monitoring capabilities indicating UE capabilities for PDCCH monitoring per slot;
transmitting an indication of PDCCH monitoring capabilities to a base station, wherein the indication includes both the first set of PDCCH monitoring capabilities indicating UE capabilities for PDCCH monitoring per span and the second set of PDCCH monitoring capabilities indicating UE capabilities for PDCCH monitoring per slot, the first set of PDCCH monitoring capabilities corresponding to a first number of control channel elements (CCEs) or blind decodes (BDs) per span, the second set of PDCCH monitoring capabilities corresponding to a second number of CCEs or BDs per slot;

receiving a configuration for one or more PDCCH monitoring occasions from the base station, wherein the configuration is based at least in part on the transmitted indication;

monitoring one or more search space sets, in accordance with the received configuration, for control information during the one or more PDCCH monitoring occasions; and decoding the control information within the one or more PDCCH monitoring occasions.

14. The method of claim 13, wherein the PDCCH monitoring capability indication includes a number of BDs, a number of downlink control information formats configurable for monitoring, or some combination thereof.

15. The method of claim 13, wherein the first set of PDCCH monitoring capabilities indicating UE capabilities for PDCCH monitoring per span and the second set of PDCCH monitoring capabilities indicating UE capabilities for PDCCH monitoring per slot are associated with a service type, a number of downlink control information formats, or some combination thereof.

16. The method of claim 13, further comprising:
identifying one or more component carriers in a band or band combination that are supported for each of the first set of PDCCH monitoring capabilities indicating UE capabilities for PDCCH monitoring per span and the second set of PDCCH monitoring capabilities indicating UE capabilities for PDCCH monitoring per slot, wherein the indication includes the one or more component carriers in the band or band combination that are supported for each of the first set and the second set.

17. The method of claim 13, wherein the received configuration includes a first configuration for a first set of PDCCH monitoring occasions based at least in part on the first set of PDCCH monitoring capabilities indicating UE capabilities for PDCCH monitoring per span, a second configuration for a second set of PDCCH monitoring occasions based at least in part on the second set of PDCCH monitoring capabilities indicating UE capabilities for PDCCH monitoring per slot, or both.

18. The method of claim 17, wherein the first configuration and the second configuration indicate two or more monitoring occasions or two or more monitoring spans that collide in time.

19. The method of claim 18, further comprising:
monitoring for one or more downlink control information formats associated with each of the two or more monitoring occasions or the two or more monitoring spans that collide in time during the two or more monitoring occasions or the two or more monitoring spans.

20. The method of claim 13, further comprising:
identifying a number of multiple input multiple output layers, a transport block size, a number of resource blocks, a processing timing parameter, or some combination thereof, that are supported for each of the first set of PDCCH monitoring capabilities indicating UE capabilities for PDCCH monitoring per span and the second set of PDCCH monitoring capabilities indicating UE capabilities for PDCCH monitoring per slot, wherein the indication includes the number of multiple input multiple output layers, the transport block size, the number of resource blocks, the processing timing parameter, or some combination thereof, that are supported for each of the first set and the second set.

21. The method of claim 13, further comprising:
identifying a band or band combination associated with a PDCCH monitoring occasion; and
identifying PDCCH capability information based at least in part on the band or band combination, wherein the indication includes the PDCCH monitoring capability information.

22. The method of claim 13, further comprising:
identifying PDCCH monitoring capability information based at least in part on a minimum time separation between the start of two spans, a maximum span length in which PDCCH is configured to be monitored with same start symbol, a multiple input multiple output capability, shared channel limitations, processing power capability, or some combination thereof, wherein the indication includes the PDCCH monitoring capability information.

23. The method of claim 22, wherein the PDCCH monitoring capability information includes a number of CCEs supported per PDCCH monitoring occasion, a number of BDs supported per PDCCH monitoring occasion, or both.

24. The method of claim 13, wherein the configuration includes, for each of the one or more PDCCH monitoring occasions, an identification parameter associated with the base station, a PDCCH monitoring occasion identification parameter, a PDCCH monitoring occasion index value, a PDCCH monitoring occasion frequency parameter, a number of consecutive symbols parameter, a number of different search space sets, one or more component carriers, an identification parameter associated with one or more downlink control information formats, an identification parameter associated with one or more service types, an identification parameter associated with one or more UE PDCCH monitoring capabilities, or any combination thereof.

25. An apparatus for wireless communications at a base station, comprising:
a processor;
memory coupled with the processor; and
instructions stored in the memory and executable by the processor to cause the apparatus to:
receive an indication of user equipment (UE) physical downlink control channel (PDCCH) monitoring capabilities from a UE and based at least in part on a carrier aggregation capability of the UE, the indication comprising a first set of UE PDCCH monitoring capabilities indicating PDCCH monitoring per span and a second set of UE PDCCH monitoring capabilities indicating PDCCH monitoring per slot, the first set of PDCCH monitoring capabilities corresponding to a first number of control channel elements (CCEs) or blind decodes (BDs) per span, the second set of PDCCH monitoring capabilities corresponding to a second number of CCEs or BDs per slot;
determine a configuration for one or more PDCCH monitoring occasions, wherein the configuration is based at least in part on the received indication;
transmit the configuration for transmission; and
transmit, in accordance with the transmitted configuration, control information for transmission during the one or more PDCCH monitoring occasions.

26. The apparatus of claim 25, wherein the instructions are further executable by the processor to cause the apparatus to:

identify UE PDCCH monitoring capability information based at least in part on the indication, wherein the configuration for one or more PDCCH monitoring occasions is determined based at least in part on the UE PDCCH monitoring capability information.

27. The apparatus of claim 26, wherein the UE PDCCH monitoring capability information includes a number of CCEs supported per PDCCH monitoring occasion, a number of BDs supported per PDCCH monitoring occasion, a number of downlink control information formats configurable for monitoring, or some combination thereof.

28. A method for wireless communications at an apparatus of a base station, comprising:
receiving an indication of user equipment (UE) physical downlink control channel (PDCCH) monitoring capabilities from a UE and based at least in part on a carrier aggregation capability of the UE, the indication comprising a first set of UE PDCCH monitoring capabilities indicating PDCCH monitoring per span and a second set of UE PDCCH monitoring capabilities indicating PDCCH monitoring per slot, the first set of PDCCH monitoring capabilities corresponding to a first number of control channel elements (CCEs) or blind decodes (BDs) per span, the second set of PDCCH monitoring capabilities corresponding to a second number of CCEs or BDs per slot;
determining a configuration for one or more PDCCH monitoring occasions, wherein the configuration is based at least in part on the received indication;
transmitting the configuration to the UE; and
transmitting, in accordance with the transmitted configuration, control information during the one or more PDCCH monitoring occasions.

29. The method of claim 28, further comprising:
identifying UE PDCCH monitoring capability information based at least in part on the received indication, wherein the configuration for one or more PDCCH monitoring occasions is determined based at least in part on the UE PDCCH monitoring capability information.

30. The method of claim 28, further comprising:
determining a first configuration for a first set of one or more PDCCH monitoring occasions based at least in part on the first set of UE PDCCH monitoring capabilities indicating PDCCH monitoring per span; and
determining a second configuration for a second set of one or more PDCCH monitoring occasions based at least in part on the second set of UE PDCCH monitoring capabilities indicating PDCCH monitoring per slot, wherein the configuration transmitted to the UE includes the first configuration and the second configuration.

* * * * *

UNITED STATES PATENT AND TRADEMARK OFFICE
CERTIFICATE OF CORRECTION

PATENT NO. : 11,044,621 B2  
APPLICATION NO. : 16/805631  
DATED : June 22, 2021  
INVENTOR(S) : Hosseini et al.

Page 1 of 1

It is certified that error appears in the above-identified patent and that said Letters Patent is hereby corrected as shown below:

In the Claims

Column 36, Lines 66-67 Claim 1 should read: transmit an indication of PDCCH monitoring capabilities, wherein the indication includes Column 40, Line 61 Claim 25 should read: transmit the configuration; and Column 40, Lines 62-64 Claim 25 should read: transmit, in accordance with the transmitted configuration, control information during the one or more PDCCH monitoring occasions.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*